United States Patent
Ozeki et al.

(10) Patent No.: US 11,034,324 B2
(45) Date of Patent: Jun. 15, 2021

(54) AIRBAG DEVICE

(71) Applicant: TOYODA GOSEI CO., LTD., Kiyosu (JP)

(72) Inventors: Makoto Ozeki, Kiyosu (JP); Takashi Sasaki, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 71 days.

(21) Appl. No.: 16/358,856

(22) Filed: Mar. 20, 2019

(65) Prior Publication Data

US 2019/0299920 A1    Oct. 3, 2019

(30) Foreign Application Priority Data

Mar. 28, 2018 (JP) .............................. JP2018-062486

(51) Int. Cl.
*B60R 21/36* (2011.01)
*B60R 21/201* (2011.01)
*B60R 21/00* (2006.01)

(52) U.S. Cl.
CPC ............ *B60R 21/36* (2013.01); *B60R 21/201* (2013.01); *B60R 2021/003* (2013.01)

(58) Field of Classification Search
CPC .. B60R 21/36; B60R 2021/003; B60R 21/201
See application file for complete search history.

(56) References Cited

U.S. PATENT DOCUMENTS

| 6,131,944 | A  | * | 10/2000 | Henkel ................... B60R 21/16 280/728.3 |
| 7,845,672 | B2 | * | 12/2010 | Onohara ................. B60R 21/20 280/728.3 |
| 8,596,679 | B2 | * | 12/2013 | Horikawa ............. B60R 21/217 280/743.2 |
| 9,598,041 | B2 | * | 3/2017  | Kwon ................... B60R 21/216 |

(Continued)

FOREIGN PATENT DOCUMENTS

| JP | 2008-80830 A   | 4/2008 |
| JP | 2009-179267 A  | 8/2009 |

(Continued)

OTHER PUBLICATIONS

Japanese Office Action dated Mar. 30, 2021, issued in corresponding Japanese Patent Application No. 2018-062486 (and English Machine Translation).

*Primary Examiner* — Karen Beck
(74) *Attorney, Agent, or Firm* — Posz Law Group, PLC

(57) ABSTRACT

An airbag device includes an airbag accommodated in the accommodation part in a state where a wrapping material is wrapped around a folding completion body formed by folding the air bag. A region of the wrapping material configured to cover an upper of the folding completion body has a double structure of an outer part and an inner part. The outer part has slits that are intermittently formed substantially along an axial direction of the folding completion body. The inner part is configured to cover a lower of the slits and is configured so that a terminal, which is an edge side distant from a region configuring the outer part of the (Continued)

wrapping material, is located below a central line extending substantially in a horizontal direction from a sectional center of the folding completion body.

4 Claims, 17 Drawing Sheets

(56) References Cited

U.S. PATENT DOCUMENTS

| | | | | |
|---|---|---|---|---|
| 2003/0234525 | A1* | 12/2003 | Igawa | B60R 21/2346 |
| | | | | 280/736 |
| 2004/0066021 | A1* | 4/2004 | Dumbrique | B60R 21/201 |
| | | | | 280/728.2 |
| 2005/0212275 | A1* | 9/2005 | Hasebe | B60R 21/233 |
| | | | | 280/743.1 |
| 2009/0194982 | A1 | 8/2009 | Yamauchi et al. | |
| 2015/0102589 | A1* | 4/2015 | Choi | B60R 21/201 |
| | | | | 280/729 |
| 2016/0264094 | A1* | 9/2016 | Suemune | B60R 21/36 |
| 2017/0008484 | A1* | 1/2017 | Takase | B60R 21/36 |
| 2017/0120853 | A1* | 5/2017 | Rose | B60R 21/201 |
| 2017/0282845 | A1* | 10/2017 | Nagasawa | B60R 21/0134 |
| 2017/0282846 | A1* | 10/2017 | Nagasawa | B60R 21/0134 |
| 2018/0086296 | A1* | 3/2018 | Kino | B60R 21/237 |
| 2018/0099639 | A1* | 4/2018 | Suemune | B60R 21/36 |
| 2018/0111579 | A1* | 4/2018 | Shimizu | B60R 21/213 |
| 2019/0039560 | A1* | 2/2019 | Ozeki | B60R 21/36 |
| 2019/0071050 | A1* | 3/2019 | Farooq | B60R 21/233 |
| 2019/0366972 | A1* | 12/2019 | Nakamura | B60R 21/0136 |
| 2020/0062202 | A1* | 2/2020 | Umezawa | B60R 21/36 |

FOREIGN PATENT DOCUMENTS

| | | | | |
|---|---|---|---|---|
| JP | 2014-065468 A | | 4/2014 | |
| JP | 2017177986 A | * | 10/2017 | B60S 1/08 |

* cited by examiner

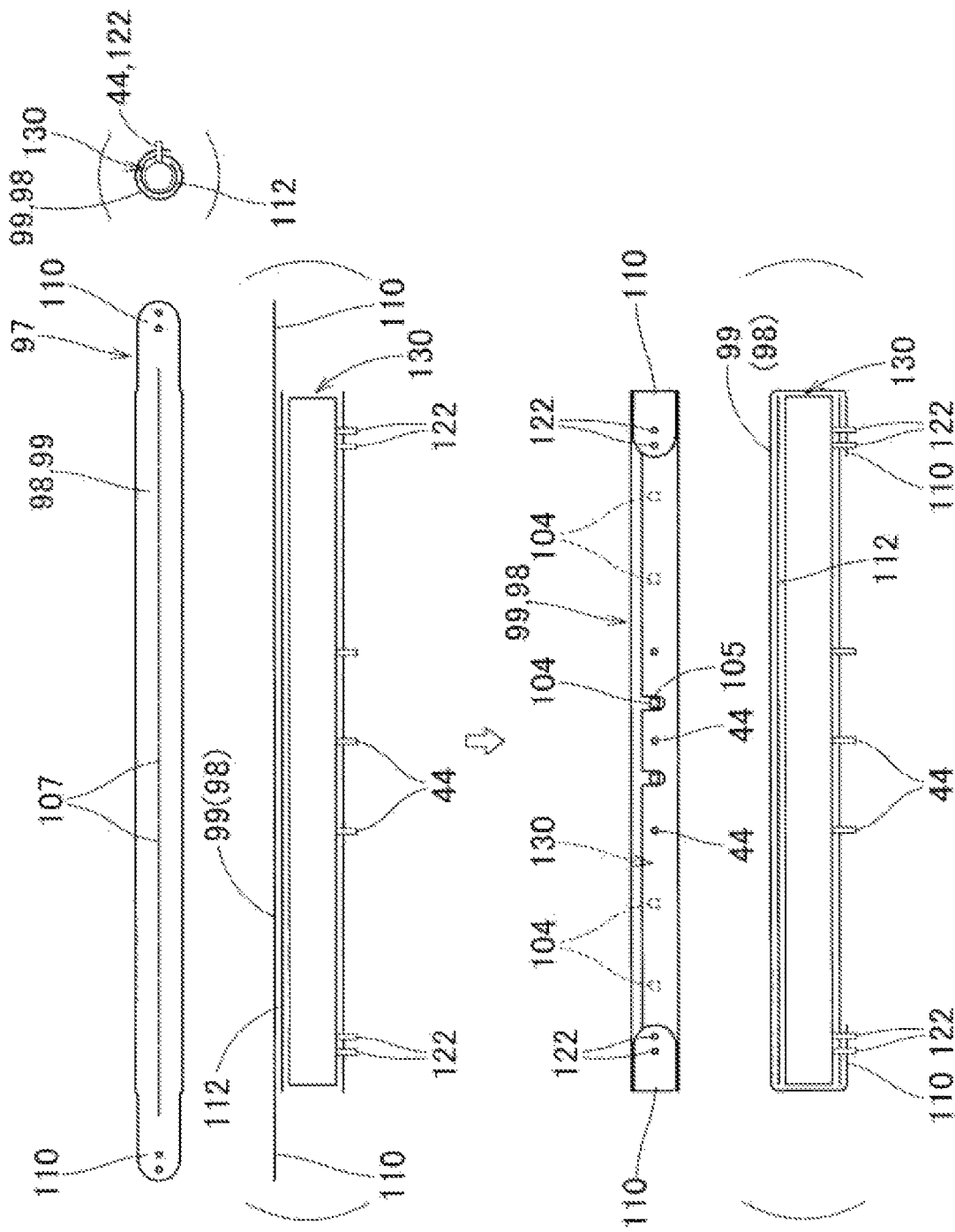

AIRBAG DEVICE

CROSS-REFERENCE TO RELATED APPLICATIONS

This application is based upon and claims the benefit of priority from prior Japanese patent application No. 2018-062486, filed on Mar. 28, 2018, the entire contents of which are incorporated herein by reference.

TECHNICAL FIELD

The present invention relates to an airbag device including an airbag accommodated with being folded in an accommodation part to be arranged at an outer side of a vehicle interior and configured to protrude toward an outside of a vehicle upon inflation.

BACKGROUND ART

Since an airbag device to be arranged at an outer side of a vehicle interior is mounted at the outer side of the interior, rainwater and the like may be introduced into a case. Considering this point, in the related art, an airbag device for pedestrian has been suggested in which a wrapping material is wrapped around a folding completion body configured by folding an airbag and a case is provided with a water-draining passage for discharging the rainwater and the like introduced into the case (for example, refer to Patent Document 1).

Patent Document 1: JP-A-2008-80830

However, the wrapping material for wrapping the folding completion body is formed with a slit for rupturing a surrounding portion thereof at an early stage of deployment and inflation of the airbag so as to rapidly deploy the airbag. Therefore, the rainwater and the like may be introduced into the folding completion body from the slit.

The present invention has been made in view of the above situations, and an object thereof is to provide an airbag device capable of rapidly deploying an airbag and correctly suppressing rainwater from being introduced into a folding completion body.

SUMMARY OF INVENTION

According to an aspect of the invention, there is provided an airbag device comprising: an airbag accommodated with being folded in an accommodation part to be arranged at an outer side of a vehicle interior and configured to protrude toward an outside of a vehicle upon inflation, the airbag accommodated in the accommodation part in a state where a wrapping material formed of a flexible sheet body is wrapped around a folding completion body formed by folding the air bag, wherein the accommodation part has an opening for protrusion at an upper side so as to enable the airbag to protrude therefrom, wherein the wrapping material is wrapped over an entire circumference around the folding completion body and a region thereof configured to cover an upper of the folding completion body has a double structure of an outer part and an inner part, wherein the outer part has slits that are intermittently formed substantially along an axial direction of the folding completion body so that peripheral edges thereof can be ruptured upon deployment and inflation of the airbag, and wherein the inner part is configured to cover a lower of the slits and is configured so that a terminal, which is an edge side distant from a region configuring the outer part of the wrapping material, is located below a central line extending substantially in a horizontal direction from a sectional center of the folding completion body.

BRIEF DESCRIPTION OF DRAWINGS

FIGS. 14A and 14B are schematic views illustrating the process of wrapping the wrapping material around the folding completion body formed by folding the airbag, depicting a next process of FIGS. 13A and 13B.

DESCRIPTION OF EMBODIMENTS

Hereinafter, an illustrative embodiment of the present invention will be described with reference to the drawings. In the illustrative embodiment, as an airbag device to be arranged at an outer side of a vehicle interior, an airbag device M for pedestrian (hereinafter, abbreviated as "airbag device M") that is to be mounted in the vicinity of a rear end 15c of a hood panel 15 of a vehicle V is exemplified.

Figure 1:
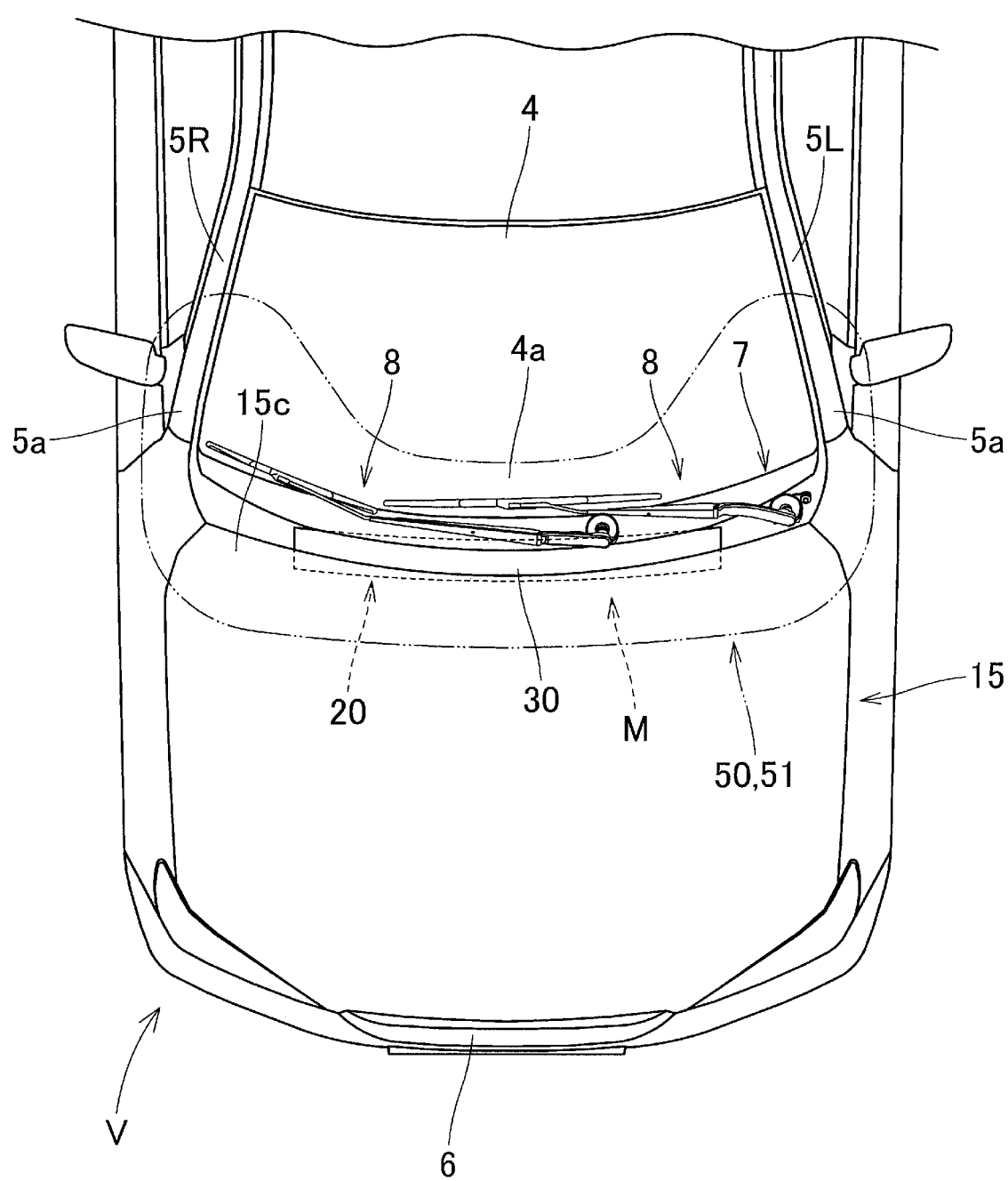
FIG. 1 is a plan view of a vehicle in which an airbag device for pedestrian of an illustrative embodiment of the present invention is mounted.
Figure 2:
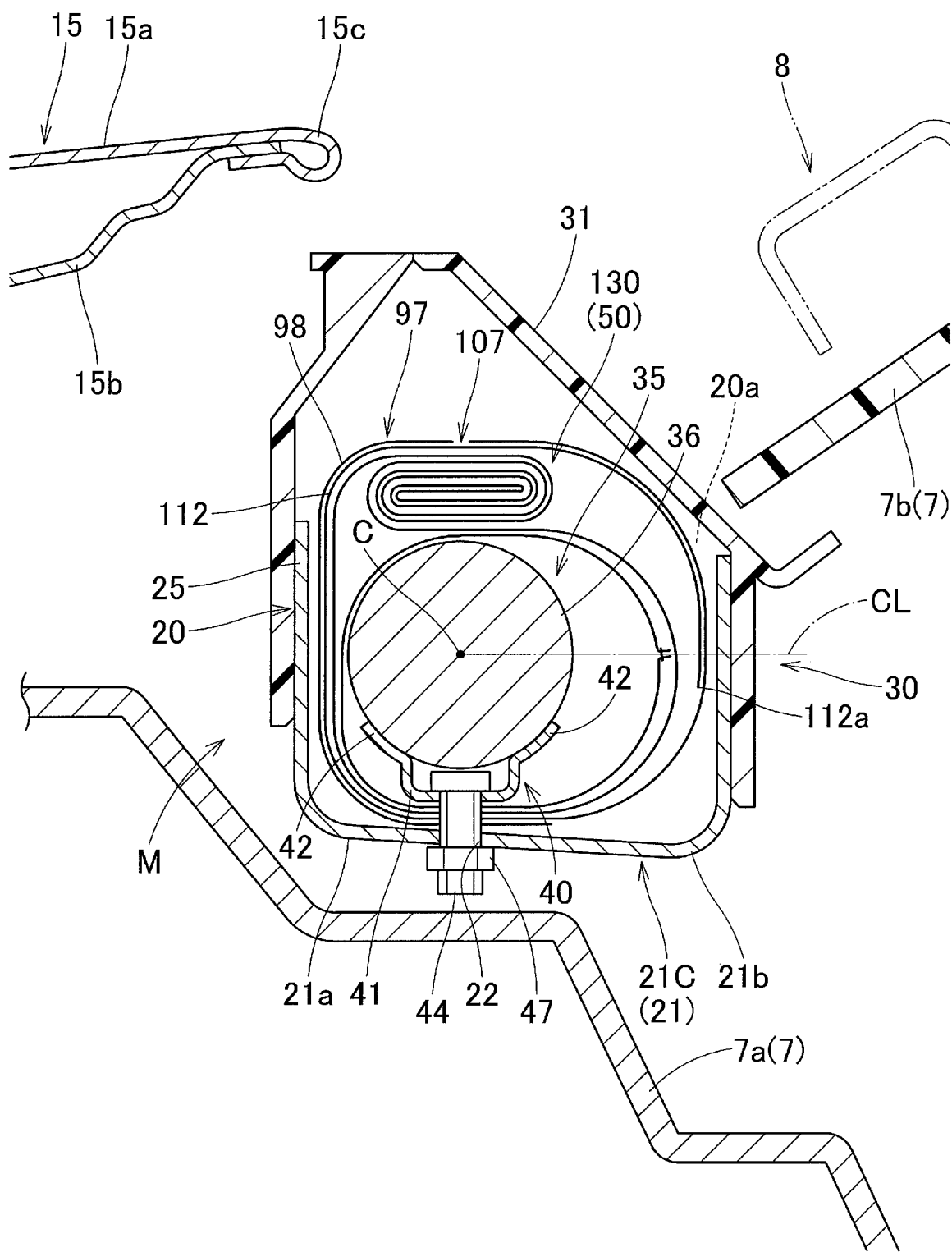
FIG. 2 is a schematic enlarged longitudinal sectional view of the airbag device for pedestrian of the illustrative embodiment taken along a front and rear direction, depicting an inflator.

As shown in FIGS. 1 and 2, the airbag device M is arranged at a position that is adjacent to a rear side of the rear end 15c of the hood panel 15 and is a substantial center in a right and left direction of the vehicle V between left and right front pillars 5L, 5R. Meanwhile, in the specification, the front and rear direction, the upper and lower direction and the right and left direction coincide with the front and rear direction, the upper and lower direction and the right and left direction of the vehicle, unless particularly mentioned.

In the illustrative embodiment, a sensor (not shown) capable of detecting a collision with a pedestrian is arranged at a front bumper 6 (refer to FIG. 1) of the vehicle V. When an activation circuit (not shown) to which a signal from the sensor is to be input detects a collision between the vehicle V and a pedestrian on the basis of the signal from the sensor, it activates an inflator 35 of the airbag device M.

As shown in FIG. 1, the hood panel 15 is arranged to cover the upper of an engine room of the vehicle V, and is coupled to a body 1 of the vehicle V to be openable and closable forward by hinge parts (not shown) arranged in the vicinity of the rear end 15c at both left and right edge sides. In the illustrative embodiment, the hood panel 15 is made of a steel plate, an aluminum (aluminum alloy) plate material or the like, and has an outer panel 15a positioned at an upper surface-side and an inner panel 15b positioned at a lower surface-side and having higher strength than the outer panel 15a, as shown in FIG. 2. As shown in FIG. 1, the rear end 15c of the hood panel 15 is curved with respect to the right and left direction so that a center in the right and left direction is positioned at the front and both left and right ends are positioned at the rear, in conformity to a front windshield 4 (which will be described later).

As shown in FIGS. 1 and 2, a cowl 7 having a cowl panel 7a provided at the body 1-side and having high stiffness and a cowl louver 7b provided above the cowl panel 7a and made of synthetic resin is arranged at the rear of the hood panel 15. The cowl louver 7b is arranged so that a rear end thereof is to continue to a lower part 4a of the front windshield 4. The cowl 7 is also curved with respect to the right and left direction so that a center in the right and left direction is positioned at the front and both left and right ends are positioned at the rear, in conformity to the curved shape of the rear end 15c of the hood panel 15 (refer to FIG. 1). Also, as shown in FIG. 1, wipers 8 are arranged at parts of the cowl 7. The wipers 8 are arranged to protrude upward from the cowl louver 7b (refer to the dashed-two dotted line in FIG. 2). The front pillars 5L, 5R are arranged at left and right outer sides of the front windshield 4.

Figure 3:
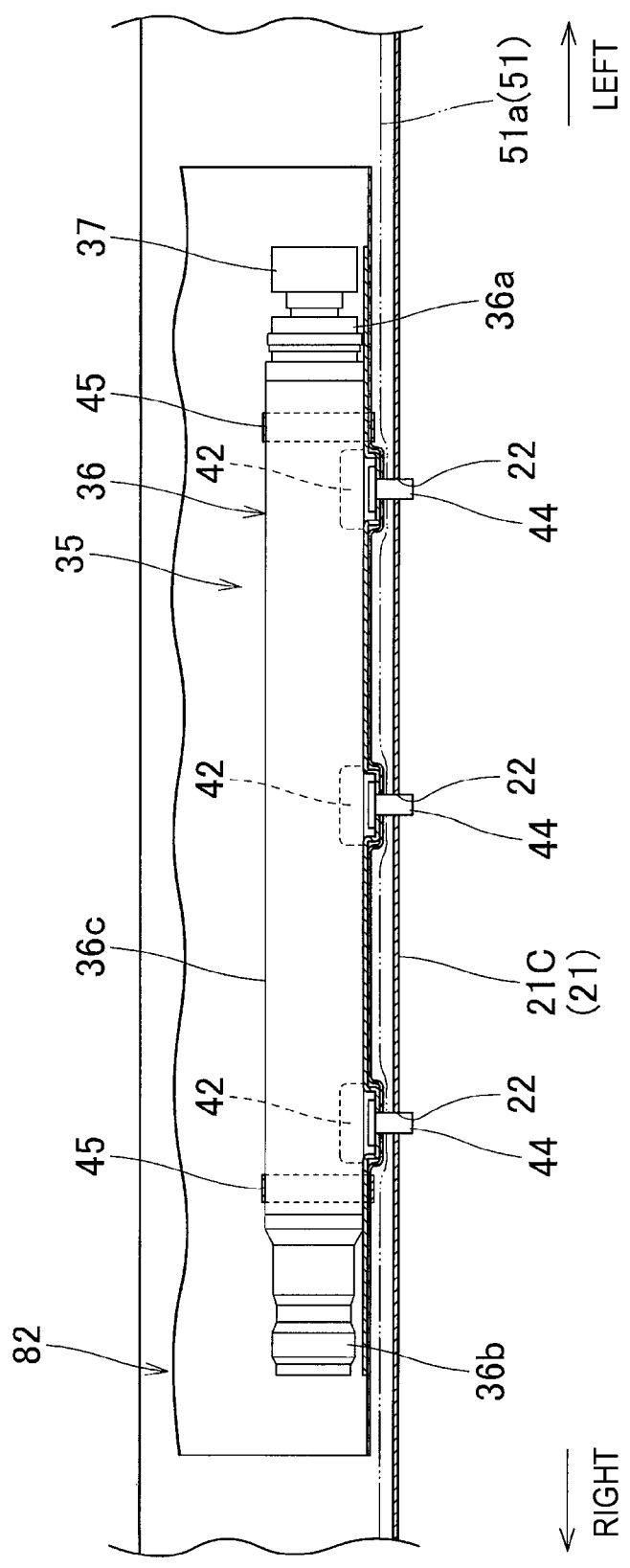
FIG. 3 is a schematic enlarged longitudinal sectional view of the airbag device for pedestrian of the illustrative embodiment taken along a right and left direction, depicting the inflator.

As shown in FIGS. 2 and 3, the airbag device M includes an airbag 50, an inflator 35 configured to supply an inflation gas to the airbag 50, a case 20 as an accommodation part configured to accommodate therein the airbag 50 and the inflator 35, an airbag cover 30 configured to cover the folded airbag 50, attachment brackets 120 configured to attach attachment piece parts 75 (which will be described later) of the airbag 50 to the case 20, and a wrapping material 97 wrapped around a folding completion body 130 formed by folding the airbag 50.

Figure 4:
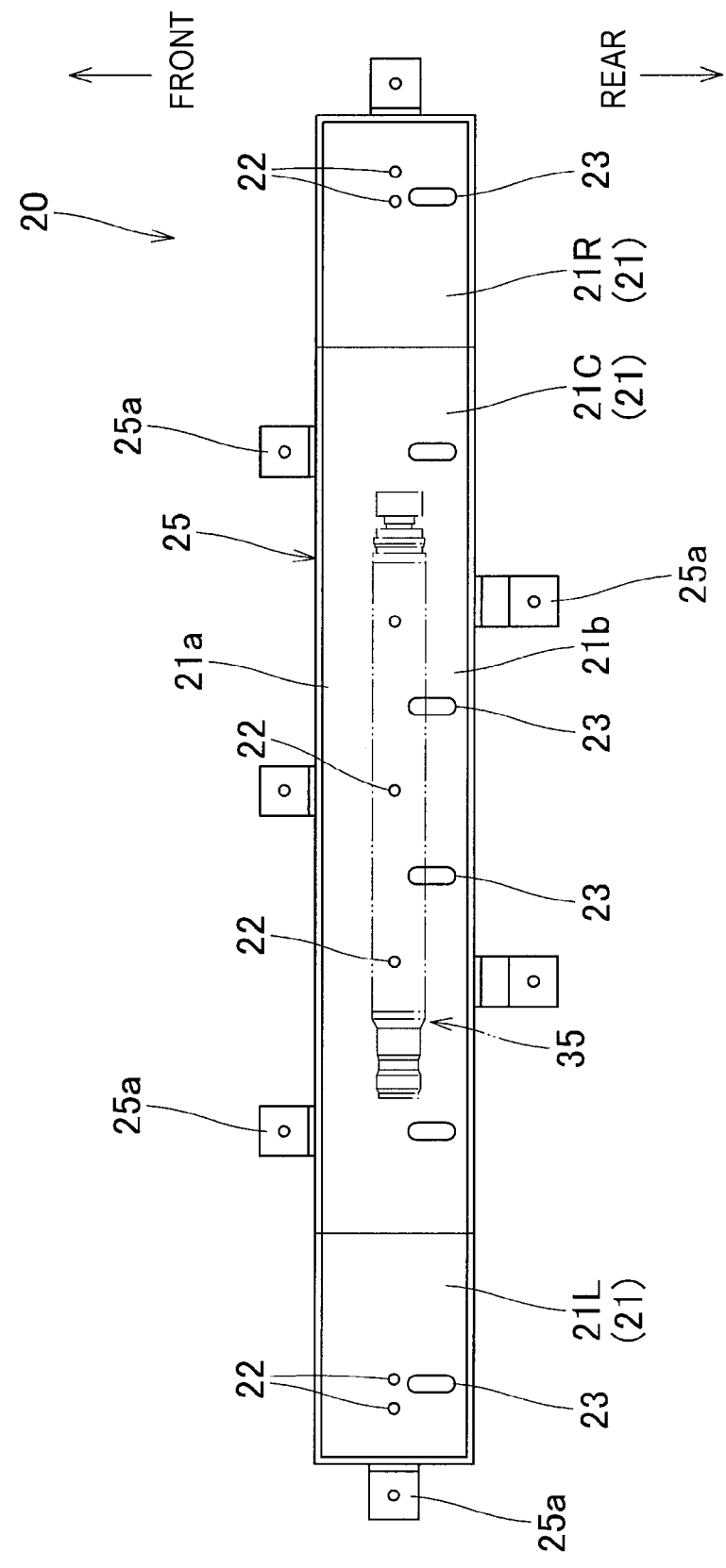
FIG. 4 is a plan view of a case that is used for the airbag device for pedestrian of the illustrative embodiment.
Figure 5:
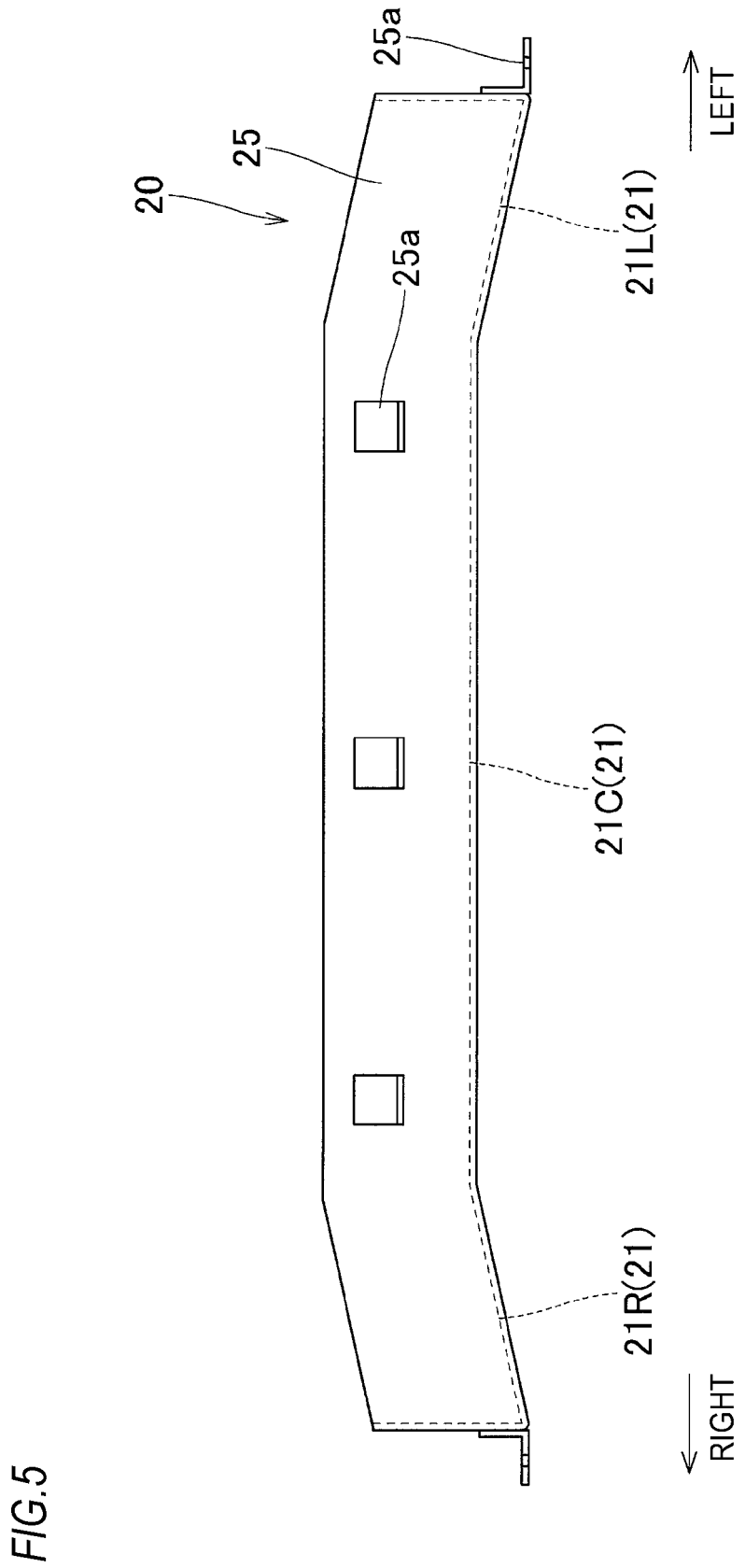
FIG. 5 is a front view of the case shown in FIG. 4.

The case 20 as the accommodation part is made of a plate, has a substantial box shape having a bottom wall part 21 and a substantially square tube-shaped peripheral wall part 25 extending upward from the bottom wall part 21 and having an opened upper end, and is configured to enable the airbag 50 being inflating to protrude from an opening 20a for protrusion formed at the upper end, as shown in FIGS. 2, 4 and 5. In the illustrative embodiment, the bottom wall part 21 is formed to be slightly inclined rearward and downward so that a rear end 21b is located at a position slightly lower than a front end 21a in a state where the airbag is mounted to the vehicle (refer to FIGS. 2 and 15). Also, the bottom wall part 21 has a central portion 21C arranged substantially in the right and left direction, and a left portion 21L and a right portion 21R inclined downward toward left and right outer sides, while keeping the inclined state relative to the front and rear direction (refer to FIG. 5). That is, the case 20 of the illustrative embodiment is configured so that the bottom wall part 21 is inclined rearward and downward and the left and right regions are inclined downward toward the outer sides. Also, the bottom wall part 21 is formed with attachment holes 22 into which attachment bolts 44 for attaching the inflator 35 and attachment bolts 122 for attaching attachment piece parts 110 of the airbag 50 are inserted and fixed with nuts 47, 124 (refer to FIG. 4). Also, the bottom wall part 21 is formed with discharge holes 23 through which rainwater and the like introduced into the case 20 can be discharged to an outside. As shown in FIG. 4, in the illustrative embodiment, the discharge holes 23 have a long hole shape of which a longitudinal direction is substantially the front and rear direction, respectively, are formed in a rear region of a center in the front and rear direction of the bottom wall part 21, and are arranged in plural (six, in the illustrative embodiment) in the right and left direction from the central portion 21C over the left portion 21L and the right portion 21R. The peripheral wall part 25 is formed with attachment piece parts 25a, which are attached to the cowl panel 7a and protrude outward in the front and rear direction and the right and left direction. The attachment piece parts 25a are formed in plural.

The airbag cover 30 is made of soft synthetic resin such as polyolefin-based thermoplastic elastomer (TPO), and has a door part 31 arranged to cover the opening 20a for protrusion formed at the upper end of the case 20 and configured to be pushed and opened by the airbag 50 upon deployment and inflation of the airbag 50 (refer to FIG. 2). Although not shown in detail, the airbag cover 30 is attached at a predetermined place to the peripheral wall part 25 of the case 20 by an attachment means (not shown).

The inflator 35 includes an inflator main body 36 of a cylinder type having a substantially circular column outer shape, and an attachment bracket 40 for attaching the inflator main body 36 to the case 20.

As shown in FIGS. 2 and 3, the inflator main body 36 has a substantially circular column outer shape and is arranged at a substantially central position in the front and rear direction and the right and left direction of a lateral inflation part 53 (which will be described later) in the bag main body 51 of the airbag 50, in a state where an axial direction is aligned in the right and left direction (refer to FIGS. 6 and 7). As shown in FIG. 3, the inflator main body 36 has a gas discharge port 37 for discharging the inflation gas at one axial end (a left end 36a), and is electrically connected to the activation circuit via a lead wire (not shown) extending from the other axial end (a right end 36b).

As shown in FIGS. 2 and 3, the attachment bracket 40 for attaching the inflator main body 36 to the case 20 has a holding part 41 for holding the inflator main body 36 and a plurality of (three, in the illustrative embodiment) attachment bolts 44 protruding downward from the holding part 41. The holding part 41 is made of a plate, has a band shape extending substantially in the right and left direction (the axial direction of the inflator main body 36) so as to support a lower surface-side of the inflator main body 36, and includes support piece parts 42 protruding toward both front and rear sides and configured to support the inflator main body 36 at a plurality of places (three places, in the illustrative embodiment) along the right and left direction. Each of the support piece parts 42 is inclined to extend upward with tip ends being directed outward in the front and rear direction from front and rear edge portions of the holding part 41 so as to support an outer peripheral surface of the inflator main body 36 and is symmetrical with respect to the front and rear direction (refer to FIG. 2). In the illustrative embodiment, the support piece part 42 is formed at a position corresponding to the attachment bolt 44. The attachment bolts 44 are formed to protrude downward at three places of both left and right ends and a substantial center in the right and left direction of the holding part 41. In the illustrative embodiment, the attachment bracket 40 is configured to attach the inflator main body 36 by winding clamps 45 from the outer periphery-side in a state where the inflator main body 36 is held in the holding part 41. In the illustrative embodiment, the clamps 45 are arranged at two places of left and right ends.

The inflator 35 has a configuration where the inflator main body 36 and the holding part 41 of the attachment bracket 40 are accommodated in the airbag 50 with the attachment bolts 44 protruding outward from insertion holes 57 and attachment holes 61 (which will be described later) in a state where the inflator main body 36 is attached to the attachment bracket 40 by using the clamps 45 (refer to FIG. 3). The inflator 35 is attached to the bottom wall part 21 of the case 20 in a state where the inflator main body 36 and the holding part 41 of the attachment bracket 40 are accommodated in the airbag 50. Specifically, as shown in FIGS. 3 and 4, the inflator 35 is attached to the central portion 21C of the bottom wall part 21. That is, the attachment bolts 44 protruding from the wrapping material 97 are arranged to protrude from the central portion 21C of the bottom wall part 21 of the case 20 and are fixed by the nuts 47, so that the inflator 35 is attached to the case 20 together with the airbag 50 (refer to FIG. 2). Also, in the illustrative embodiment, the inflator 35 is accommodated in the airbag 50 with the outer peripheries of the inflator main body 36 and the holding part 41 of the attachment bracket 40 being covered by a cylindrical inner tube 82 having flexibility (refer to FIGS. 2, 3 and 7).

Figure 6:
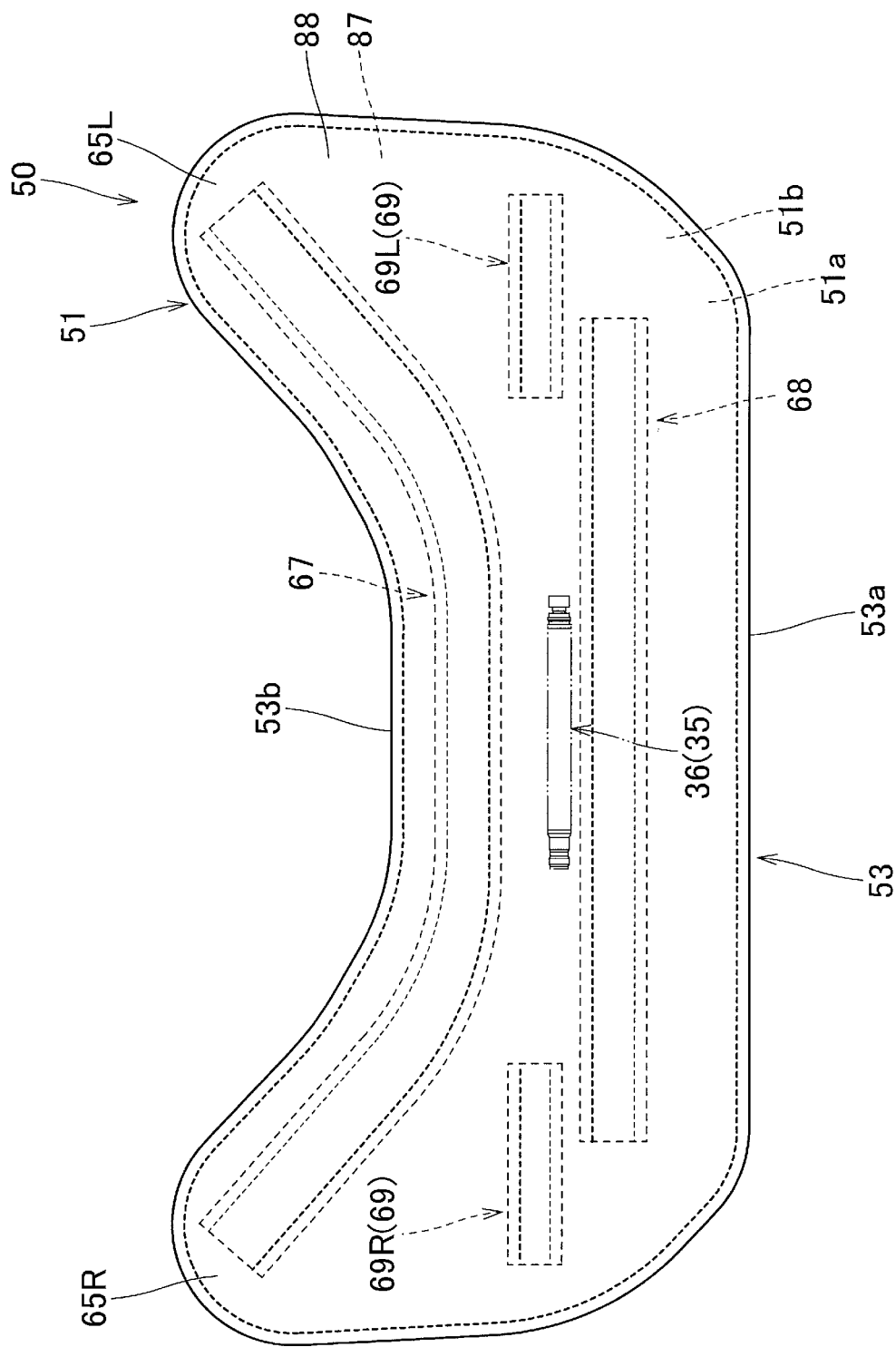
FIG. 6 is a plan view depicting a flatly-deployed state of an airbag that is used for the airbag device for pedestrian of the illustrative embodiment.
Figure 7:
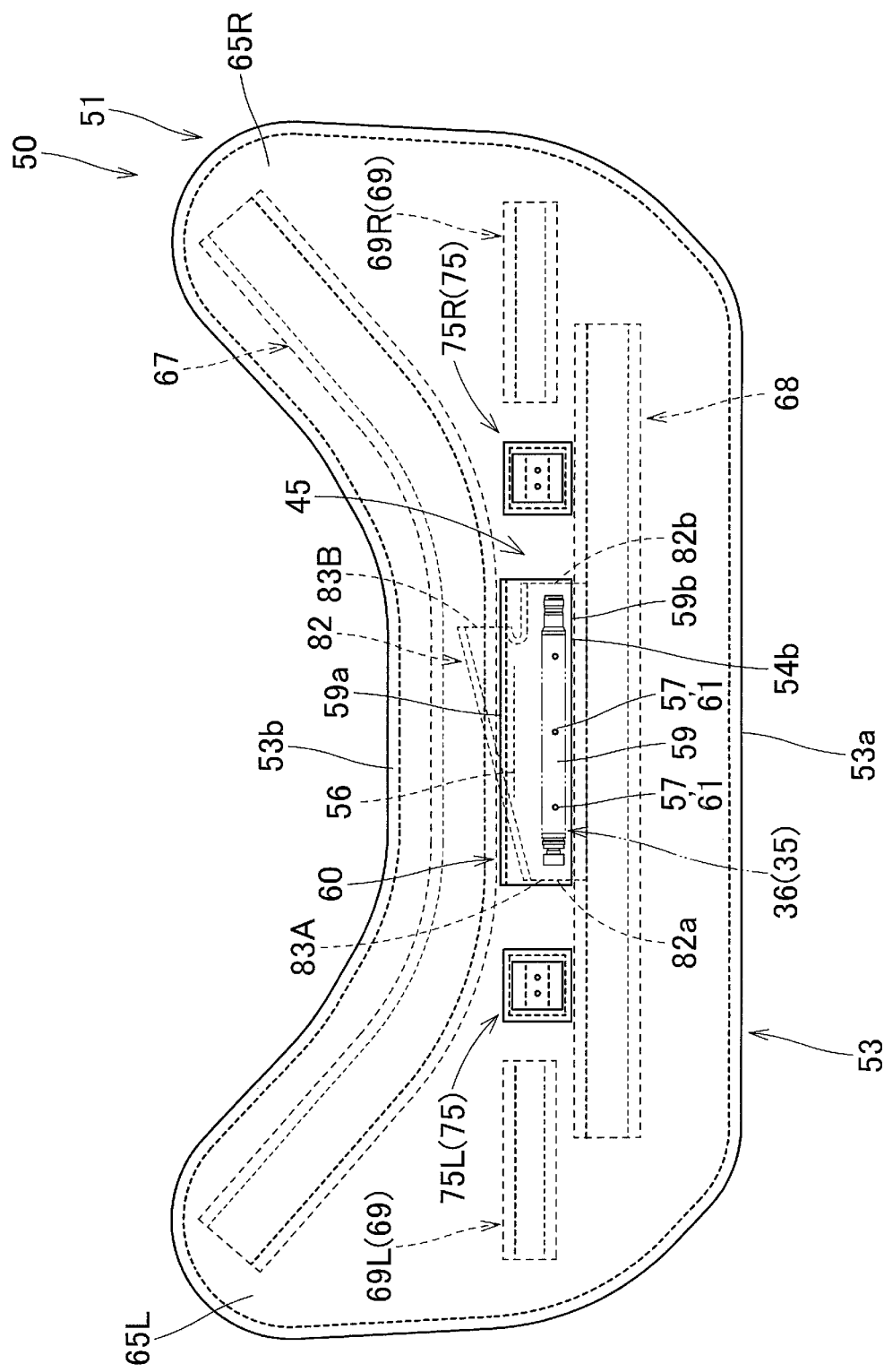
FIG. 7 is a bottom view depicting the flatly-deployed state of the airbag of FIG. 6.

As shown in FIGS. 6 and 7, the airbag 50 has a bag main body 51 configured to inflate by enabling the inflation gas to flow therein, attachment piece parts 75 for attaching a vehicle body-side wall part 51a (which will be described later) of the bag main body 51 to the case 20, and an inner tube 82 configured to cover the outer periphery-side of the inflator 35 in the bag main body 51.

The bag main body 51 has a substantial U-shape, which is wide in the right and left direction, as seen from the front, upon completion of the inflation, and includes a lateral inflation part 53 to be arranged substantially in the right and left direction so as to conform to the lower part 4a of the front windshield 4, and longitudinal inflation parts 65L, 65R extending rearward from both ends of the lateral inflation part 53 and configured to cover lower parts 5a of front surfaces of the left and right front pillars 5L, 5R. The bag main body 51 has a pedestrian-side wall part 51b to be positioned at an upper surface-side and a vehicle body-side wall part 51a to be positioned at a lower surface-side so as to face the pedestrian-side wall part 51b upon completion of the inflation, and outer peripheral surfaces of the pedestrian-side wall part 51b and the vehicle body-side wall part 51a are joined (sewn) to each other over an entire circumference, so that the bag main body 51 has a bag shape.

In the illustrative embodiment, upon completion of the inflation, the lateral inflation part 53 is configured to cover an upper surface-side (front surface-side) of a region from the rear end 15c-side of the hood panel 15 to the lower part 4a-side of the front windshield 4 via the cowl 7, including the wipers 8, too. In the bag main body 51 of the illustrative embodiment, the vehicle body-side wall part 51a is formed at a position around the lateral inflation part 53 with an opening part 55 for insertion for inserting therein the inflator 35.

As shown in FIG. 7, the opening part 55 for insertion has a slit 56 for insertion formed in the vehicle body-side wall part 51a, insertion holes 57 for inserting the attachment bolts 44 of the inflator 35, and a cover panel 59 configured to block the slit 56 for insertion from an outer periphery-side. The slit 56 for insertion is provided so as to insert the inflator main body 36, and has a linear shape substantially along the right and left direction so as to follow an axial direction of the inflator main body 36. The slit 56 for insertion has a length dimension set smaller than a length dimension of the inflator main body 36 (refer to FIG. 7). The insertion holes 57 are provided so as for the attachment bolts 44 of the inflator 35 to protrude therefrom, and are formed at three places along the right and left direction, in correspondence to the attachment bolts 44. In the illustrative embodiment, the insertion holes 57 are formed in a front region of the slit 56 for insertion in the state where the bag main body 51 is flatly deployed. The cover panel 59 is formed by a flexible sheet body, is configured to block the slit 56 for insertion at the outer periphery-side of the vehicle body-side wall part 51a and has a substantially rectangular outer shape of which a width in the right and left direction is larger. The cover panel 59 has a rear end 59b that is joined to the vehicle body-side wall part 51a by a joining portion 60 formed over a substantially entire region in the right and left direction at a rear position of the slit 56 for insertion, and a front end 59a having attachment holes 61 for enabling the attachment bolts 44 of the inflator 35 to protrude therefrom, which are arranged in correspondence to the insertion holes 57.

Figure 11:
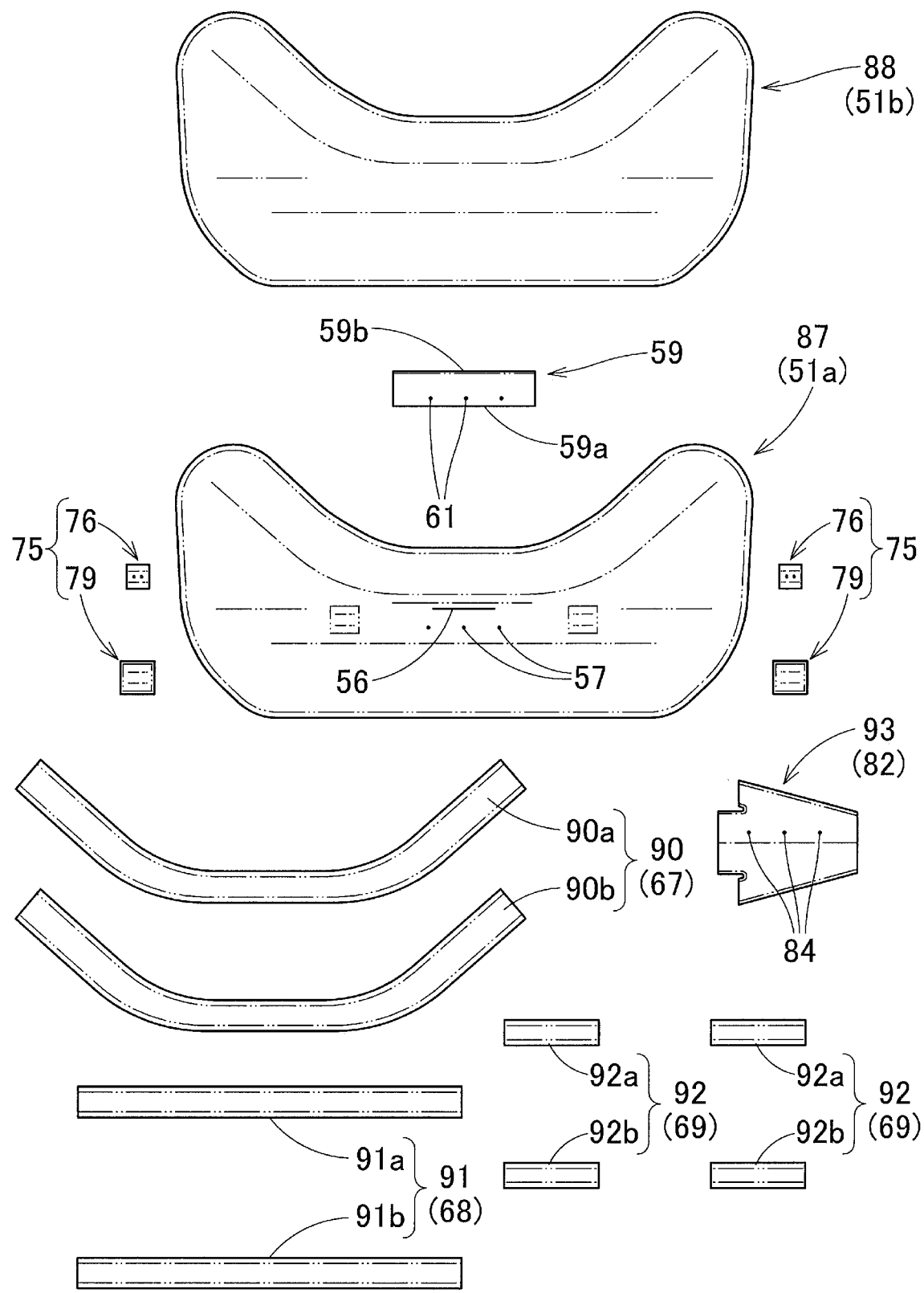
FIG. 11 is a plan view depicting that base materials configuring the airbag of FIG. 6 are set in array.

Also, in the bag main body 51, a rear-side center tether 67, a front-side center tether 68 and end-side tethers 69 (69L, 69R) configured to couple the pedestrian-side wall part 51b and the vehicle body-side wall part 51a so as to regulate a spaced distance between the pedestrian-side wall part 51b and the vehicle body-side wall part 51a upon completion of the inflation are arranged (refer to FIGS. 6 and 7). The rear-side center tether 67 is arranged in a rear region of the center in the front and rear direction over a region from the lateral inflation part 53 to the left and right longitudinal inflation parts 65L, 65R, in a gentle curve shape over an entire length so as to follow a rear edge of the flatly-deployed bag main body 51. As shown in FIG. 11, the rear-side center tether 67 is formed by two base fabrics 90 for tether of a vehicle body-side part 90a to be arranged at the vehicle body-side wall part 51a-side and a pedestrian-side part 90b to be arranged at the pedestrian-side wall part 51b-side. The front-side center tether 68 is arranged in a front region of the center of the lateral inflation part 53 in the front and rear direction, in a substantially linear shape along the right and left direction so as to substantially follow a front edge of the flatly-deployed bag main body 51. As shown in FIG. 11, the front-side center tether 68 is also formed by two base fabrics 91 for tether of a vehicle body-side part 91a to be arranged at the vehicle body-side wall part 51a-side and a pedestrian-side part 91b to be arranged at the pedestrian-side wall part 51*b*-side. The end-side tethers 69 (69L, 69R) are respectively arranged at front positions of the respective longitudinal inflation parts 65L, 65R, in a region between the front-side center tether 68 and the rear-side center tether 67. The end-side tethers 65 (65L, 65R) are also arranged to be bilaterally symmetric, in a substantially linear shape along the right and left direction. As shown in FIG. 11, the end-side tethers 69 (69L, 69R) are respectively formed by two base fabrics 92 for tether of a vehicle body-side part 92*a* to be arranged at the vehicle body-side wall part 51*a*-side and a pedestrian-side part 92*b* to be arranged at the pedestrian-side wall part 51*b*-side.

Figure 8:
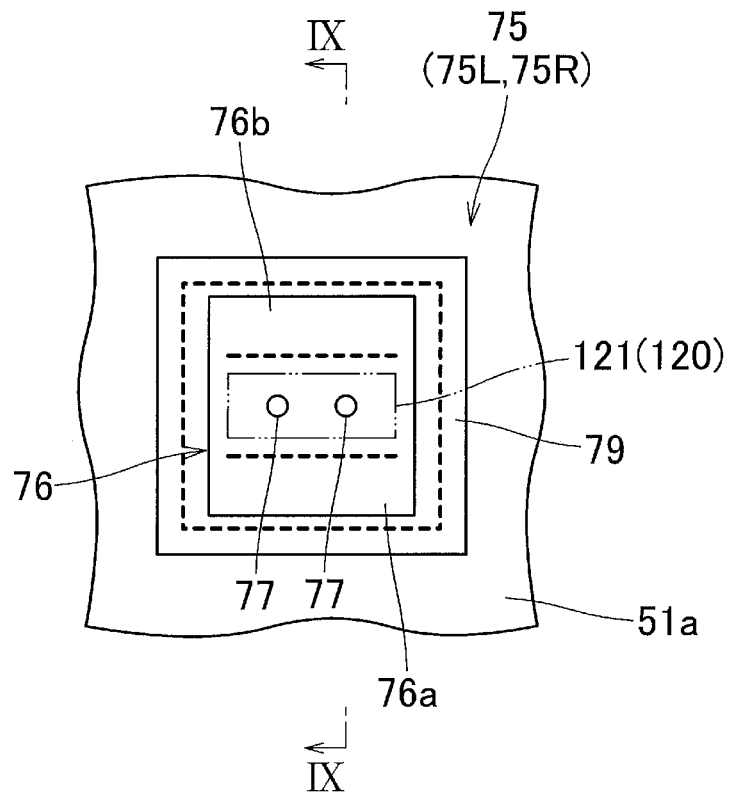
FIG. 8 is a partially enlarged bottom view depicting an attachment piece part of the airbag of FIG. 6.
Figure 9:
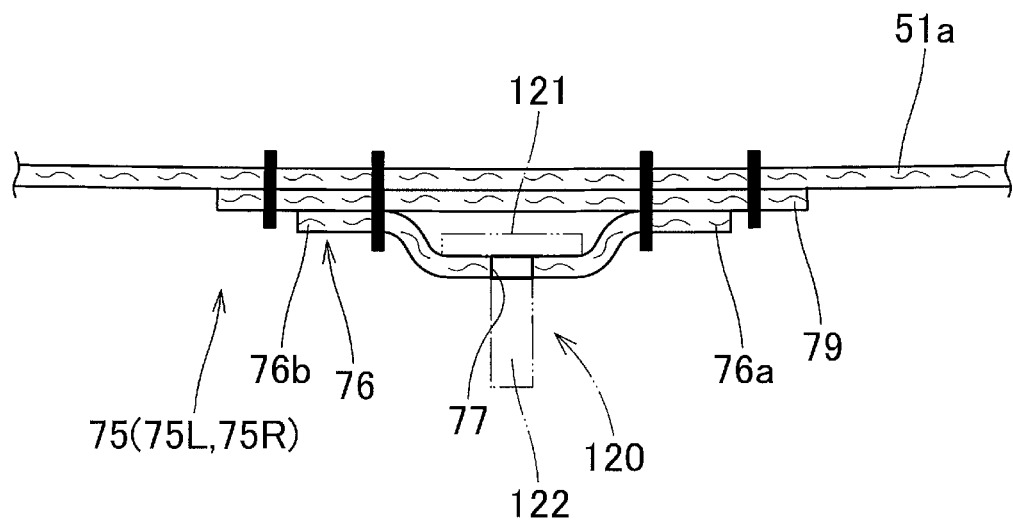
FIG. 9 is a sectional view taken along a line IX-IX of FIG. 8.

The attachment piece part 75 for attaching the vehicle body-side wall part 51*a* of the bag main body 51 to the case 20 is configured by a flexible sheet body, as a separate body from the bag main body 51, and is joined (sewn) to the vehicle body-side wall part 51*a*, as shown in FIGS. 8 and 9. The attachment piece part 75 is attached to the bottom wall part 21 of the case 20 by using the attachment bracket 120. In the illustrative embodiment, as shown in FIG. 7, the attachment piece parts 75 (75L, 75R) are arranged at two positions, which are substantially bilaterally symmetric, between the opening part 55 for insertion and the respective end-side tethers 69L, 69R in the flatly-deployed state of the bag main body 51. Also, each attachment piece part 75 is arranged at a position, which is a substantial center in the front and rear direction, between the front-side center tether 68 and the rear-side center tether 67. In the illustrative embodiment, the respective attachment piece parts 75 are attached in regions of the left portion 21L and the right portion 21R of the bottom wall part 21.

Figure 10:
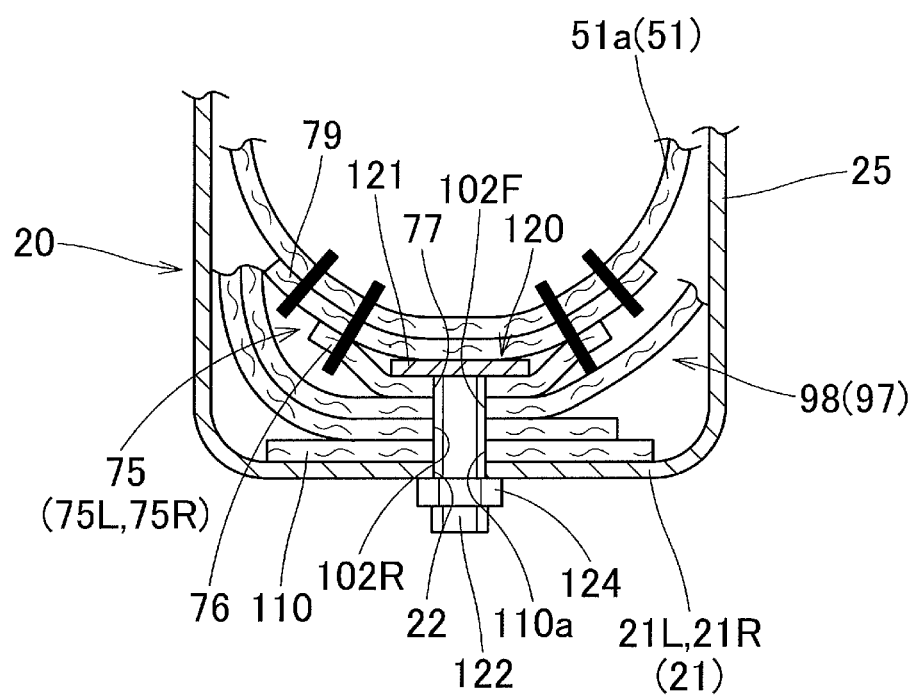
FIG. 10 is a longitudinal sectional view depicting a state where the attachment piece part is attached to the case in the airbag device for pedestrian of the illustrative embodiment.

As shown in FIGS. 8 and 9, each attachment piece part 75 has an attachment piece main body 76, and a reinforcement piece part 79 arranged between the attachment piece main body 76 and the vehicle body-side wall part 51*a*. The attachment piece main body 76 has a substantially rectangular outer shape, and a front edge 76*a* and a rear edge 76*b* thereof are joined (sewn) to the vehicle body-side wall part 51*a* via the reinforcement piece part 79. The attachment piece main body 76 is formed with through-holes 77 in which the attachment bolts 122 (which will be described later) provided to the attachment bracket 120 can be inserted. The two through-holes 77 are aligned side by side in the right and left direction at a substantial center of the attachment piece main body 76 in the front and rear direction. The reinforcement piece part 79 is formed to be larger than the attachment piece main body 76 by one dimension, and an outer peripheral edge thereof, which is an outer side of the attachment piece main body 76, is joined (sewn) to the vehicle body-side wall part 51*a* over an entire circumference. As shown with the dashed-two dotted line in FIG. 9 and FIG. 10, the attachment piece part 75 is configured so that the attachment bolts 122 of the attachment bracket 120 are arranged to protrude from the through-holes 77 and an attachment plate 121 of the attachment bracket 120 is arranged between the attachment piece main body 76 and the reinforcement piece part 79.

The inner tube 82 configured to cover the outer periphery-side of the inflator main body 36 is configured by a flexible sheet body and has a cylindrical shape, as shown in FIG. 7. In the illustrative embodiment, the inner tube 82 has a configuration where a right end 82*b* is configured as a base end in a flatly-deployed state, the inflator 35 is inserted from the right end 82*b*, both left and right ends are opened, a left end 82*a*, which is a tip end, is branched and the left end 82*a* is provided with two outlets 83A, 83B for enabling the inflation gas, which is to be discharged from the inflator main body 36, to flow out toward the left and the oblique right upper. The inner tube 82 is formed with insertion holes 84 from which the attachment bolts 44 of the attachment bracket 40 holding the inflator main body 36 are to protrude (refer to FIG. 11).

As shown in FIG. 11, the airbag 50 has a vehicle body-side base fabric 87 configuring the vehicle body-side wall part 51*a* of the bag main body 51, a pedestrian-side base fabric 88 configuring the pedestrian-side wall part 51*b*, the base fabrics 90, 91, 92 for tether configuring the rear-side center tether 67, the front-side center tether 68 and the end-side tether 69, a base fabric 93 for tube configuring the inner tube 82, the cover panel 59, and the attachment piece main body 76 and reinforcement piece part 79 configuring the attachment piece part 75. In the meantime, the base fabric (material) is formed by cutting a coated fabric, which is obtained by applying a coating agent for gas leakage prevention to a surface of a woven fabric formed by weaving polyamide yarn, polyester yarn or the like, into a predetermined shape.

The wrapping material 97 wrapped over the entire circumference around the folding completion body 130 formed by folding the airbag 50 is formed by a flexible sheet body. In the illustrative embodiment, like the base material configuring the airbag 50, the wrapping material 97 is formed by a coated fabric, which is obtained by applying a coating agent for gas leakage prevention to a surface of a woven fabric formed by weaving polyamide yarn, polyester yarn or the like.

Figure 12:
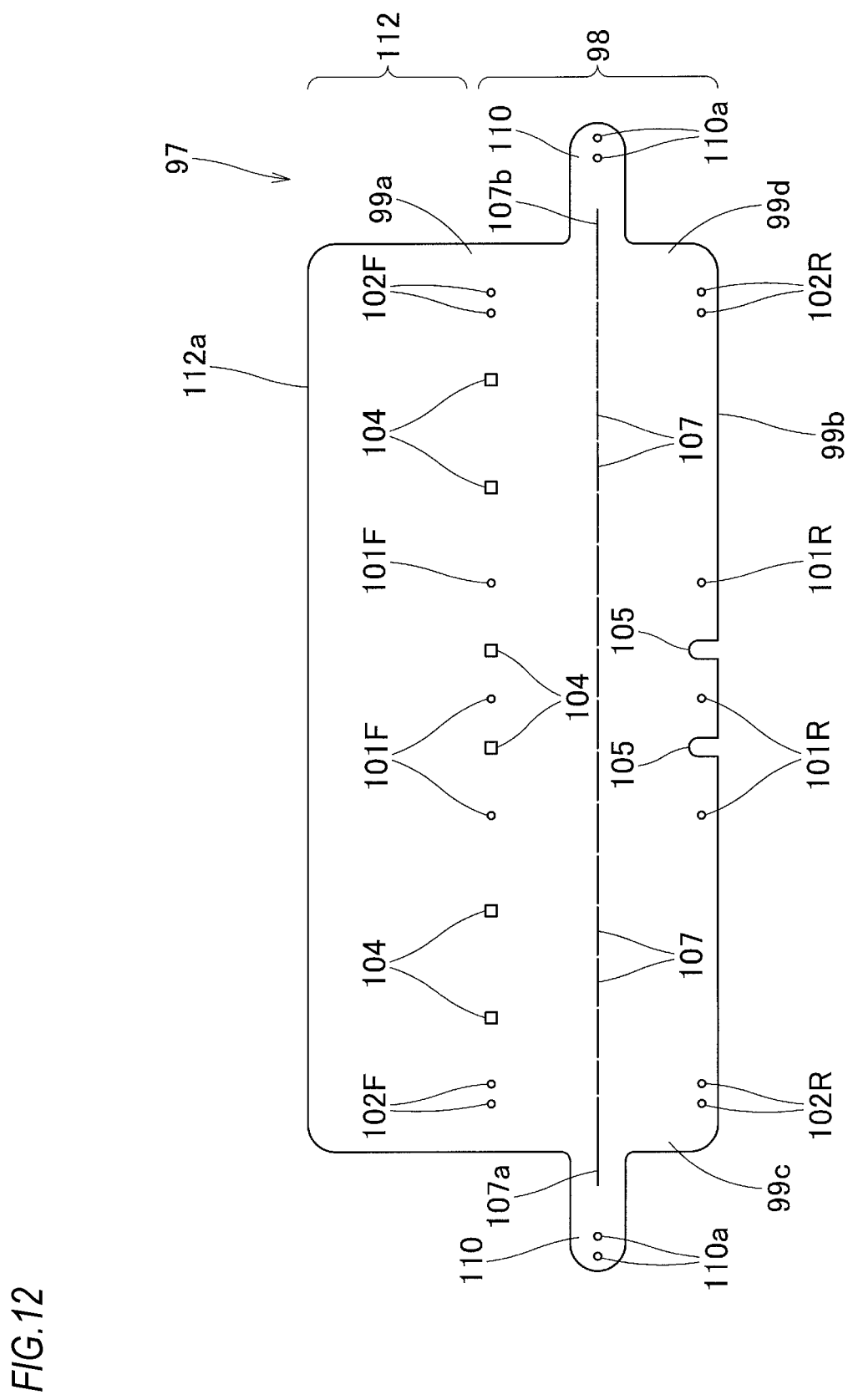
FIG. 12 is a plan view depicting a flatly-deployed state of a wrapping material that is used for the airbag device for pedestrian of the illustrative embodiment.
Figure 15:
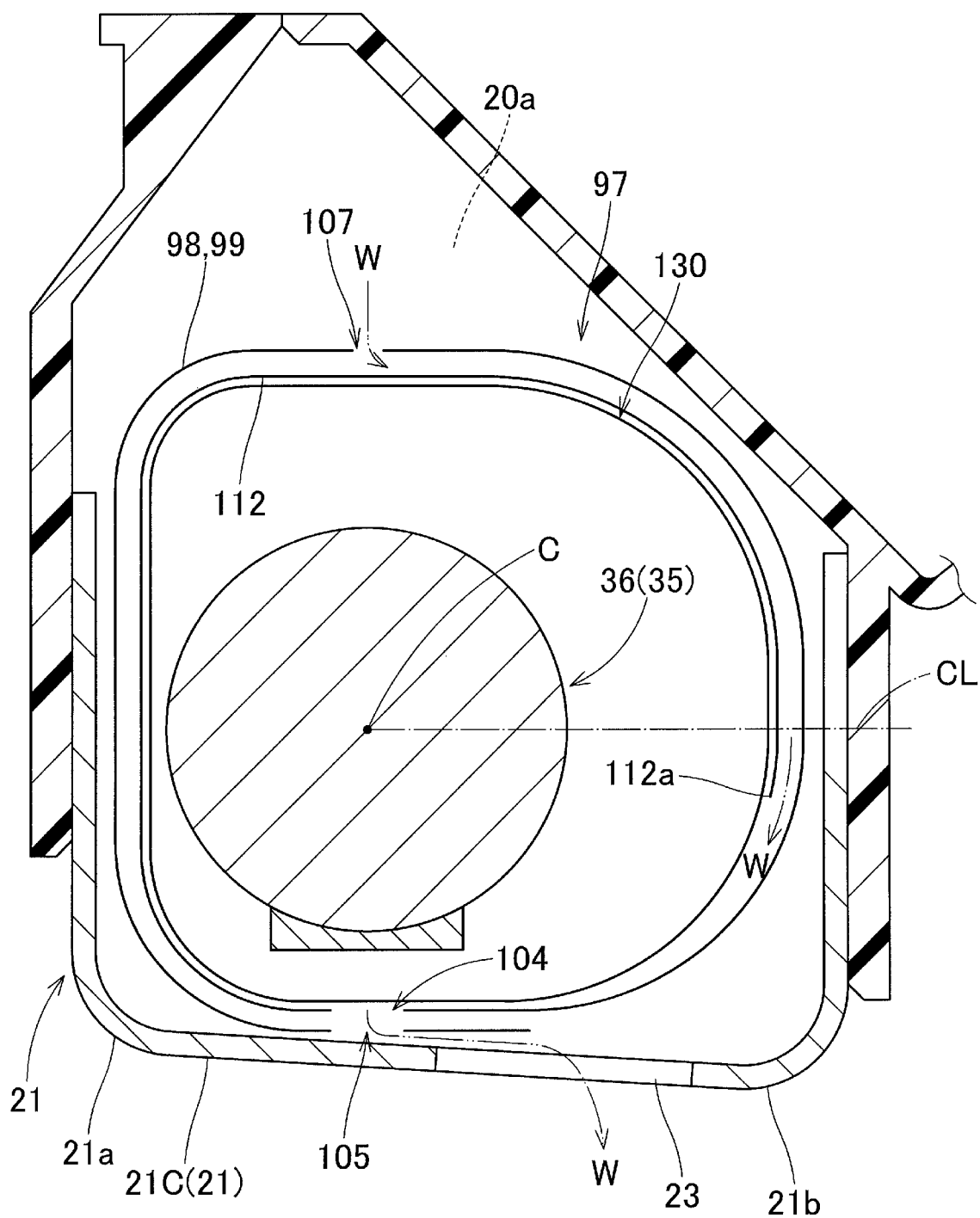
FIG. 15 is a schematic partially enlarged sectional view depicting discharge of rainwater when the rainwater has been introduced into the wrapping material from a slit, in the airbag device for pedestrian of the illustrative embodiment.
Figure 16:
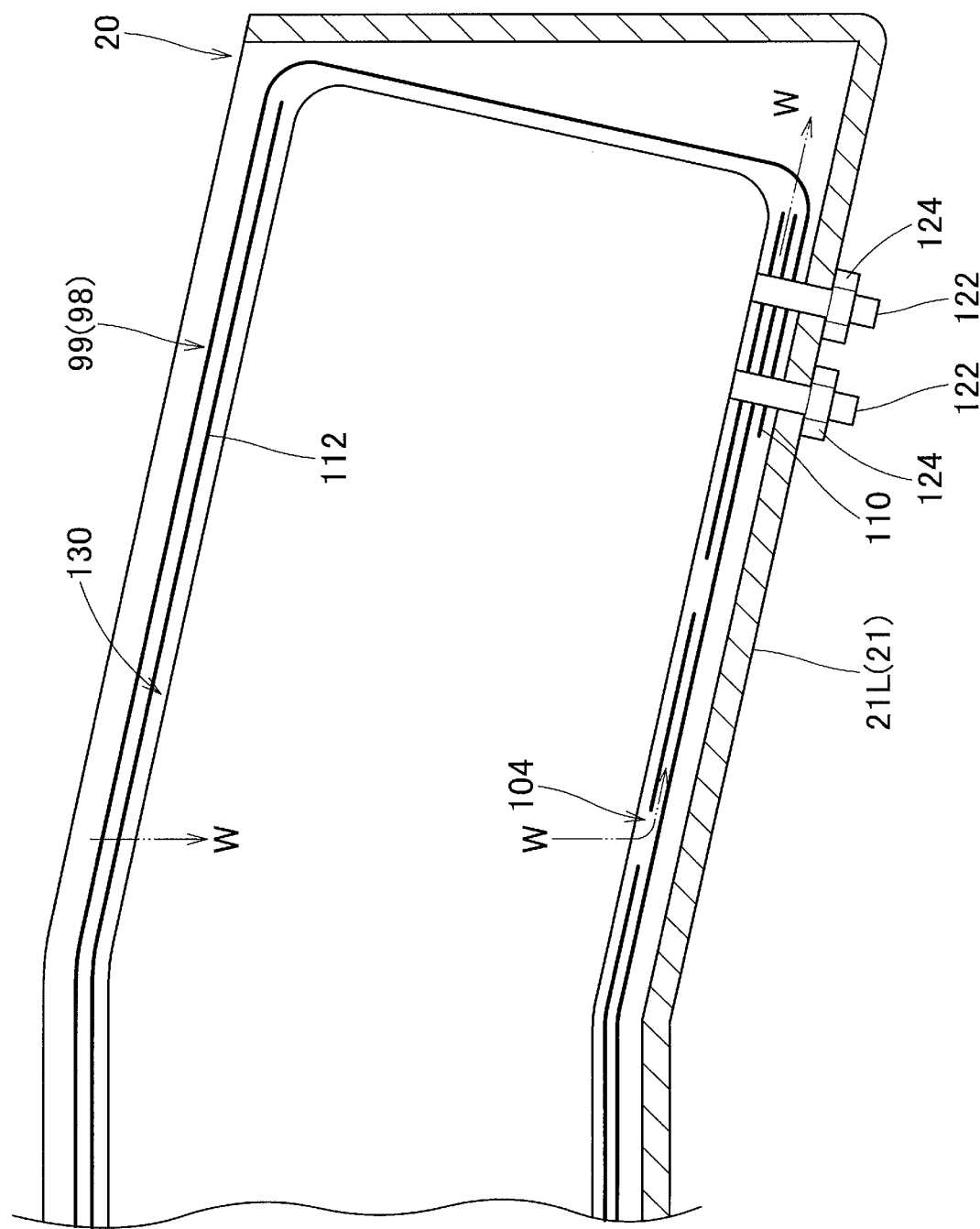
FIG. 16 is a schematic partially enlarged sectional view depicting discharge of the rainwater when the rainwater has been introduced into the wrapping material in the airbag device for pedestrian of the illustrative embodiment.

In the illustrative embodiment, the wrapping material 97 is wrapped around the folding completion body 130, which is formed by folding the airbag 50, into a substantial rod shape substantially along the right and left direction, which is a longitudinal direction, in a state where the inflator 35 is accommodated (refer to FIGS. 2, 15 and 16). The wrapping material 97 has a substantially rectangular outer shape in the flatly-deployed state (refer to FIG. 12), a width dimension in the longitudinal direction, which is substantially the same as the length dimension of the folding completion body 130, and a double structure having an inner part 112 arranged at an inner side and an outer part 98 configured to cover an outer side of the inner part 112 in a state where the wrapping material is wrapped around the folding completion body 130 (refer to FIGS. 2, 15 and 16). As shown in FIG. 12, the outer part 98 and the inner part 112 have the same width dimension in the longitudinal direction (the width dimension of the folding completion body 130 in the axial direction) and are configured to continue in the width direction.

The outer part 98 has a main body part 99 configured to cover the outer periphery-side of the folding completion body 130 over the entire circumference, and attachment piece parts 110, 110 protruding from edge portions (a left edge 99*c* and a right edge 99*d*) of the main body part 99 in the longitudinal direction. Each attachment piece part 110 is formed at a substantial center of the main body part 99 in the width direction (in the front and rear direction in the flatly-deployed state), and is formed at a tip end with two insertion holes 110*a* in which the attachment bolts 122 for attaching the attachment piece part 75 of the airbag 50 are to be inserted. Both ends (a front end 99*a* and a rear end 99*b* in the flatly-deployed state) of the main body part 99 in the width direction are formed with insertion holes 101F, 101R, 102F, 102R in which the attachment bolts 44 for attaching the inflator 35 and the attachment bolts 122 for attaching the attachment piece parts 75 of the airbag 50 are to be inserted. The insertion holes 101F, 101R are respectively formed in a central region of the outer part 98 in the right and left direction three by three, in correspondence to the attachment bolts 44, and the insertion holes 102F, 102R are respectively formed at both left and right ends of the outer part 98 two by two, in correspondence to the attachment bolts 122. Also, a plurality of openings 104 formed to have a substantial square shape by cutting is arranged in the longitudinal direction (the right and left direction) of the main body part 99 in the vicinity of a boundary between the outer part 98 and the inner part 112 (in the vicinity of an end portion of the inner part 112-side and in the vicinity of the front end 99a in the flatly-deployed state). Specifically, the openings 104 are formed so as to discharge the rainwater, which is to be introduced between the wrapping material 97 and the folding completion body 130 when mounted to the vehicle, to an outside. In the illustrative embodiment, one opening 104 between the insertion holes 101F and two openings 104 between the insertion hole 101F and the insertion hole 102F are arranged, so that a total of six openings 104 are arranged. That is, the openings 104 are formed so that the outer peripheral surface of the folding completion body 130 is exposed, in the region extending from the outer part 98 to cover a lower side of the folding completion body 130 when mounted to the vehicle. Also, an end portion (the rear end 99b in the flatly-deployed state) of the outer part 98, which is distant from the inner part, is formed in regions between the insertion holes 101R (regions to cover the lower of the front end 99a of the outer part 98) with cutout portions (openings) 105 formed by cutting an end edge (so as to be concave forward) at positions (refer to B of FIG. 14) overlapping the openings 104 in the state where the outer part 98 is wrapped around the folding completion body 130.

A substantial center of the outer part 98 in the width direction is intermittently formed with slits 107 along the longitudinal direction (the axial direction of the folding completion body 130). The slits 107 are formed to have intervals (coupling portions) therebetween by intermittently making linear cut lines at the outer part 98, and are arranged at an upper position (the opening 20a for protrusion of the case 20) of the folding completion body 130 in the state where the outer part 98 is accommodated with being wrapped around the folding completion body 130 in the case 20 (refer to FIGS. 2 and 15). The slits 107 are ruptured at peripheral edge portions (the portions between the slits 107; the coupling portions) upon the inflation of the airbag 50. The slits 107 are configured so that end portions 107a, 107b are located in the regions of the attachment piece parts 101 beyond the main body part 99 (refer to FIG. 12).

The inner part 112 is arranged to extend forward continuously from the front end 99a of the main body part 99 of the outer part 98 in the flatly-deployed state of the wrapping material 97, and is configured to cover the lower of the slits 107 below (between the main body part 99 of the outer part 98 and the folding completion body 130) the main body part 99 of the outer part 98 in the state where the wrapping material 97 is wrapped around the folding completion body 130. Specifically, as shown in FIGS. 2 and 15, upon the mounting to the vehicle, the inner part 112 is configured to cover a region from the front side to the rear side of the folding completion body 130 via the upper side, and is configured so that a terminal 112a (a front edge in the flatly-deployed state), which is an edge side distant from the region configuring the outer part 98, is located below a central line CL extending substantially in a horizontal direction from a sectional center C of the folding completion body 130 upon the mounting to the vehicle.

The attachment brackets 120 for attaching the respective attachment piece parts 75 to the bottom wall part 21 of the case 20 have a substantially rectangular plate-shaped attachment plate 121 and the attachment bolts 122 protruding downward from the attachment plate 121, respectively. As shown with the dashed-two dotted line in FIG. 8, the attachment plate 121 has a substantially rectangular outer shape of which a width in the right and left direction is larger, and is configured to cover a lower surface-side over a substantially entire region thereof by the attachment piece main body 76 upon attachment to the attachment piece part 75. The attachment bracket 120 is configured to attach the attachment piece part 75 to the bottom wall part 21 of the case 20 by enabling the attachment bolts 122 protruding from the attachment piece main body 76 of the attachment piece part 75 to protrude from the wrapping material 97 and from the bottom wall part 21 of the case 20 and fixing the attachment bolts with the nuts 124 (refer to FIGS. 15 and 16). Specifically, in the illustrative embodiment, the respective attachment piece parts 75 are attached to the regions of the left portion 21L and right portion 21R of the bottom wall part 21.

Subsequently, a process of mounting the airbag device of the illustrative embodiment to the vehicle is described. The inflator 35 is inserted in advance in the inner tube 82 with the attachment bolts 44 protruding from the insertion holes 84 in a state where the inflator main body 36 is held to the attachment bracket 40 by using the clamps 45. Then, the airbag 50 is folded so as to be accommodated in the case 20. Specifically, although not shown in detail, in the flatly-deployed state of the airbag 50 with the vehicle body-side wall part 51a and the pedestrian-side wall part 51b overlapping with each other, the left and right edge portions, which are located at the outermore sides than the attachment piece parts 75 in the right and left direction, are accordion folded to reduce the width dimension in the right and left direction, and the folded airbag reduced in the right and left direction is roll-folded to wrap the vehicle body-side wall part 51a from the rear edge, so that the folding completion body 130 having a substantial rod shape extending in the right and left direction is formed (refer to FIG. 13A). The folding completion body 130 is wrapped by a rupturable tape material (not shown) for folding collapse prevention at predetermined places except the region adjacent to the opening part 55 for insertion and the region of the attachment piece parts 75. Then, the cover panel 59 of the opening part 55 for insertion is opened, the inner tube 82 having the inflator 35 inserted therein is inserted into the bag main body 51 via the slit 56 for insertion, the respective attachment bolts 44 are arranged to protrude from the insertion holes 57 and the inflator 35 is accommodated in the bag main body 51. Then, the cover panel 59 is closed to cover the slit 56 for insertion, and the respective attachment bolts 44 are inserted into the attachment holes 61. Also, the attachment bolts 122 are arranged to protrude from the through-holes 77, so that the attachment brackets 120 are attached to the attachment piece parts 75.

Figure 13A:
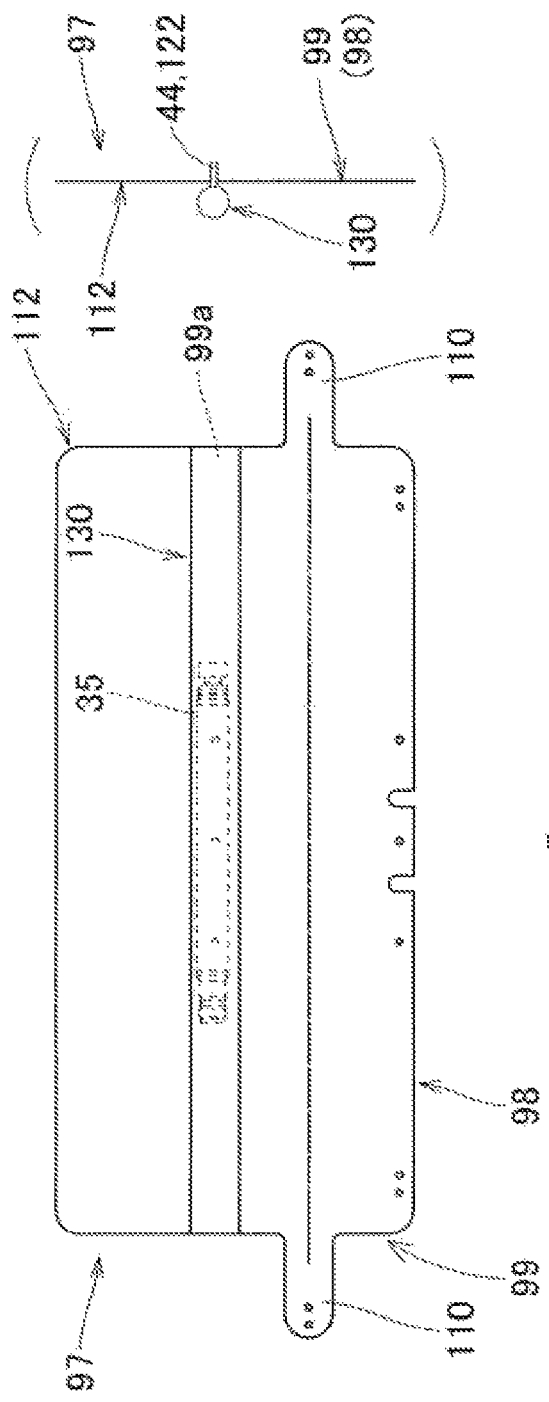
FIGS. 13A and 13B are schematic views illustrating a process of wrapping the wrapping material around a folding completion body formed by folding the airbag.
Figure 13B:
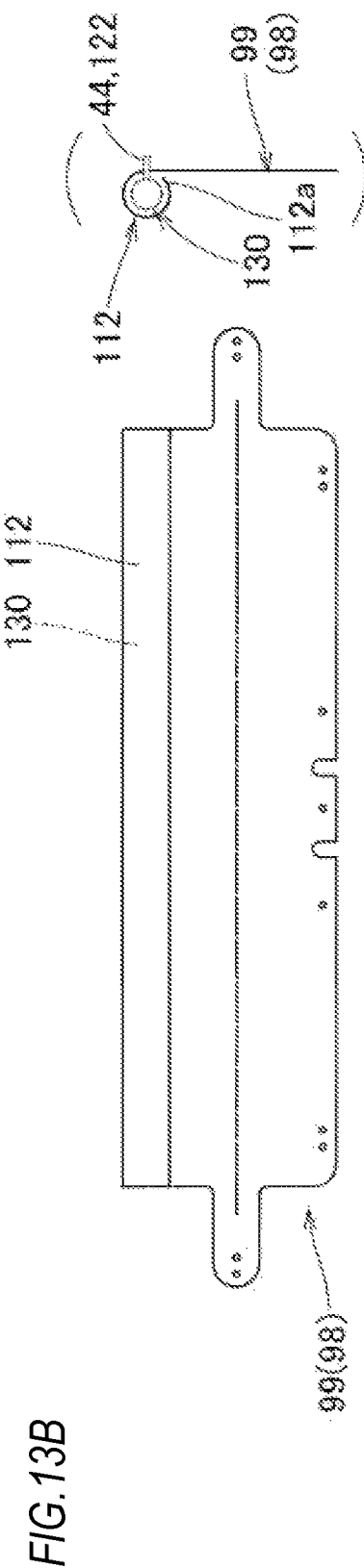

Then, the wrapping material 97 is wrapped around the folding completion body 130. First, as shown in FIG. 13A, the folding completion body 130 is put at the front end 99a-side of the outer part 98 of the wrapping material 97 in the flatly-deployed state, the attachment bolts 44 of the inflator 35 are arranged to protrude from the insertion holes 101F and the attachment bolts 122 of the attachment brackets 120 are arranged to protrude from the insertion holes 102F. Then, the inner part 112 is wrapped around the folding completion body 130 so as to cover the region from the front surface to the rear surface of the folding completion body 130 via the upper surface with the terminal 112a facing rearward (refer to FIG. 13B). Then, the outer part 98 is wrapped around the folding completion body 130 so as to cover the inner part 112, the attachment bolts 44 of the inflator 35 are arranged to protrude from the insertion holes 101R formed at the rear end 99b-side and the attachment bolts 122 of the attachment bracket 120 are arranged to protrude from the insertion holes 102R (refer to FIG. 14A). Thereafter, when the respective attachment piece parts 110 are arranged to cover both the left and right ends of the folding completion body 130 while the attachment bolts 122 are arranged to protrude from the insertion holes 110a, the operation of wrapping the wrapping material 97 around the folding completion body 130 is completed, so that an airbag assembly can be manufactured, as shown in FIG. 14B.

Thereafter, when the airbag assembly is accommodated in the case 20 with the respective attachment bolts 44, 122 protruding from the bottom wall part 21 and the nuts 47, 124 are fastened to the respective attachment bolts 44, 122 protruding from the bottom wall part 21, the airbag 50 and the inflator 35 can be attached to the case 20. Then, when the airbag cover 30 is attached to the case 20, the case 20 is attached to the cowl panel 7a by using a bracket (not shown) and the inflator main body 36 is connected to the activation circuit (not shown), the airbag device M can be mounted to the vehicle V.

In the airbag device M of the illustrative embodiment, when the activation circuit (not shown) detects a collision between the vehicle V and a pedestrian, based on a signal from the sensor (not shown) arranged at the front bumper 5, the inflator 35 is activated to enable the inflation gas to flow into the airbag 50, so that the airbag 50 inflates. The airbag 50 being inflating ruptures the peripheral edge region of the slits 107 of the wrapping material 97 to separate the outer part 98 in the front and rear direction, to bounce the inner part 112 so that the terminal 112a is to face forward and to push and open the door part 31 of the airbag cover 30, and protrudes upward from the opening 20a for protrusion of the case 20, which is formed as the door part 31 is pushed and opened, and covers the region from the upper surface of the rear end 15c of the hood panel 15 to the front surface-side of the lower part 4a of the front windshield 4 and the lower parts 5a-side of the front surfaces of the front pillars 5L, 5R via the upper surface of the cowl 7, thereby completing the inflation (refer to the dashed-two dotted line in FIG. 1).

In the airbag device M of the illustrative embodiment, the wrapping material 97 wrapped around the folding completion body 130 has the configuration where the slits 107 for rupturing the peripheral edges thereof upon the deployment and inflation of the airbag 50 are arranged in the region covering the upper of the folding completion body 130. However, since the wrapping material 97 has the inner part 112 so as to cover the lower of the slits 107, even when the rainwater W and the like are introduced into the wrapping material 97 from the slits 107, the rainwater W is suppressed from being further introduced into the folding completion body 130 by the inner part 112 and flows along the inner part 112 (refer to FIG. 15). Since the inner part 112 is configured so that the terminal 112a is located below the central line CL extending substantially along the horizontal plane from the sectional center C of the folding completion body 130, it is possible to correctly drop the rainwater W flowing along the inner part 112 from the terminal 112a so that the rainwater W is to drop from the folding completion body 130 without being directed toward the folding completion body 130, thereby causing the rainwater W to be collected at a part, which covers the lower surface-side of the folding completion body 130, of the wrapping material 97 or to flow along the part, which covers the lower surface-side of the folding completion body 130, and to be discharged to the outside. For this reason, in the airbag device M of the illustrative embodiment, even when the rainwater W and the like are introduced via the slits 107, it is possible to correctly prevent the rainwater W from flowing toward the folding completion body 130. Also, upon the deployment and inflation of the airbag 50, the peripheral edge portions of the slits 107 are ruptured, so that it is possible to rapidly deploy the airbag 50.

Therefore, according to the airbag device M of the illustrative embodiment, it is possible to rapidly deploy the airbag 50 and to correctly suppress the rainwater W from being introduced into the folding completion body 130.

Also, in the airbag device M of the illustrative embodiment, the openings 104 for exposing the outer peripheral surface of the folding completion body 130 are formed in the region (the region of the front end 99a-side) extending from the outer part 98, which covers the lower side of the folding completion body 130, of the wrapping material 97. Therefore, it is possible to securely discharge the rainwater W dropped from the terminal 112a of the inner part 112 from the openings 104 to the outside. Specifically, in the airbag device M of the illustrative embodiment, the region, which covers the lower side of the folding completion body 130, of the wrapping material 97 has the double structure of the region of the front end 9a-side and the region of the rear end 99b-side. However, in the central region in which the inflator 35 is arranged, the openings 104 are respectively formed at the position between the attachment bolts 44 for attaching the inflator 35 to the bottom wall part 21 and the cutout portions 105 are formed at the positions corresponding to the openings 104 in the region of the rear end 99b-side of the outer part 98 covering the outer side (lower side) of the openings 104 (refer to FIG. 14B). For this reason, even when the rainwater W is introduced into the central region in which the inflator 35 is arranged, it is possible to immediately discharge the rainwater W dropped from the terminal 112a from the openings 104 and the cutout portions (openings) 105 to the outside of the wrapping material 97. Also, in the airbag device M of the illustrative embodiment, the bottom wall part 21 of the case 20 configured to accommodate therein the folding completion body 130 is slightly inclined rearward and downward and the bottom wall part 21 is formed with the discharge holes 23 having a long hole shape in the rear region of the center in the front and rear direction. For this reason, the rainwater W discharged from the wrapping material 97 onto the central portion 21C of the bottom wall part 21 flows along the bottom wall part 21 and can be immediately discharged from the discharge holes 23 to the outside of the case 20 (refer to FIG. 15). The outer side (the lower) of the openings 104 of the wrapping material 97 formed in the regions of both the left and right ends is covered by the region of the rear end 99b-side of the outer part 98. Therefore, when the rainwater W is introduced therein, the rainwater W dropped from the terminal 112a of the inner part 112 flows on the region of the rear end 99b-side of the outer part 98 via the openings 104. In the airbag device M of the illustrative embodiment, the left portion 21L and the right portion 21R of the bottom wall part 21 of the case 20 are inclined downward toward the left and right outer sides. Therefore, the rainwater W flows along the region of the rear end 99b-side of the outer part 98 due to the inclination and can be discharged from the left edge 99c-side or right edge 99d-side of the outer part 98 to the outside of the wrapping material 97 (refer to FIG. 16). Also, the left portion 21L and the right portion 21R of the bottom wall part 21 are also slightly inclined rearward and downward and are respectively formed with the discharge holes 23 having a long hole shape in the rear region of the center in the front and rear direction. Therefore, the rainwater W discharged onto the left portion 21L and the right portion 21R also flows along the left portion 21L and the right portion 21R and can be immediately discharged from the discharge holes 23 to the outside of the case 20.

That is, in the airbag device M of the illustrative embodiment, even when the rainwater W is introduced into the wrapping material 97 via the slits 107, it is possible extremely suppress the rainwater W from flowing toward the folding completion body 130 and to rapidly discharge the rainwater W to the outside. Therefore, even when the airbag 50 is manufactured by a sewing operation using a sewing thread and is folded so that a seam is exposed to the outer surface-side of the folding completion body 130, it is possible to correctly prevent the rainwater from being introduced into a region of the seam.

Figure 17:
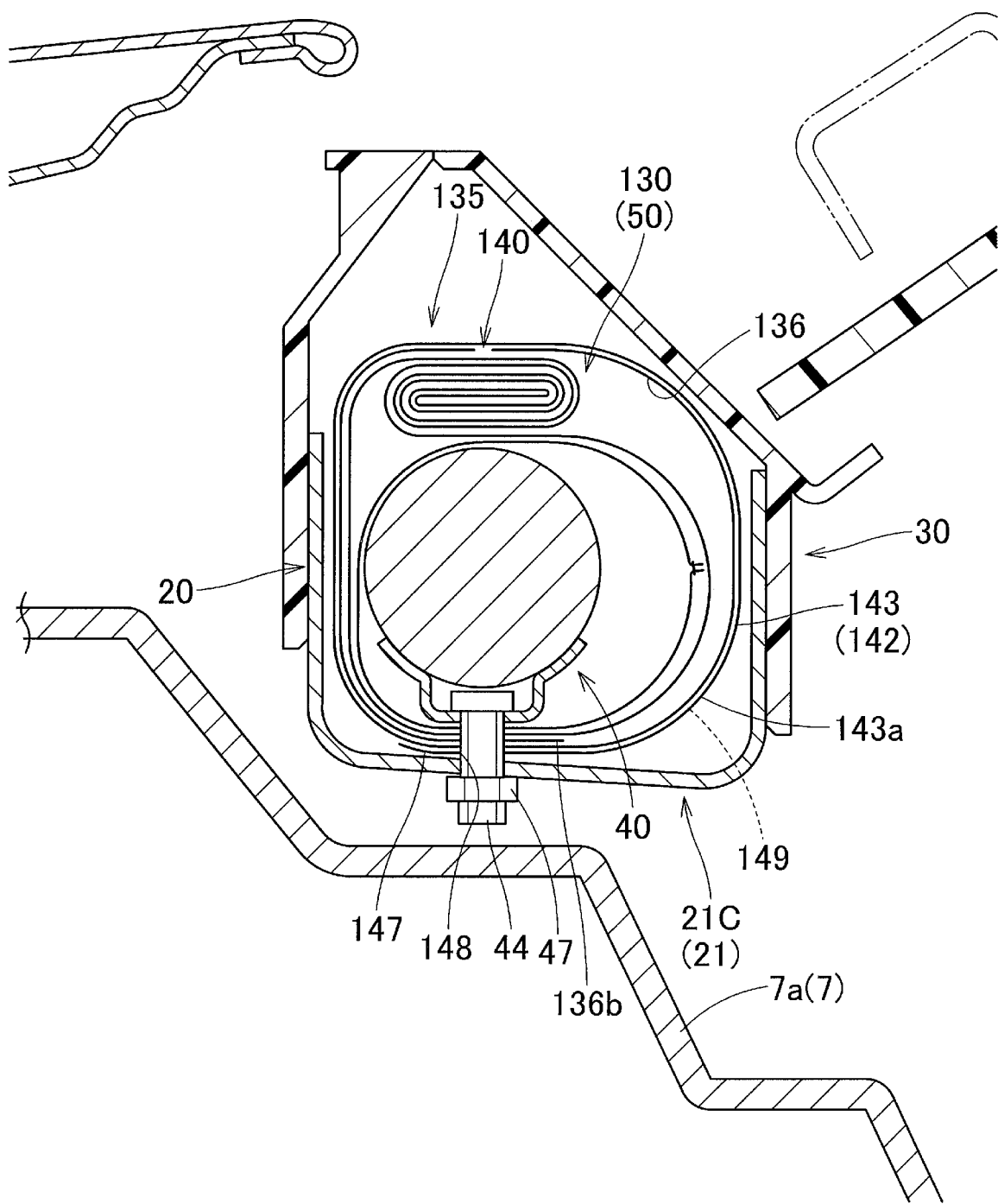
FIG. 17 is a schematic enlarged longitudinal sectional view of the airbag device for pedestrian for which a wrapping material of another illustrative embodiment of the present invention is used.
Figure 18:
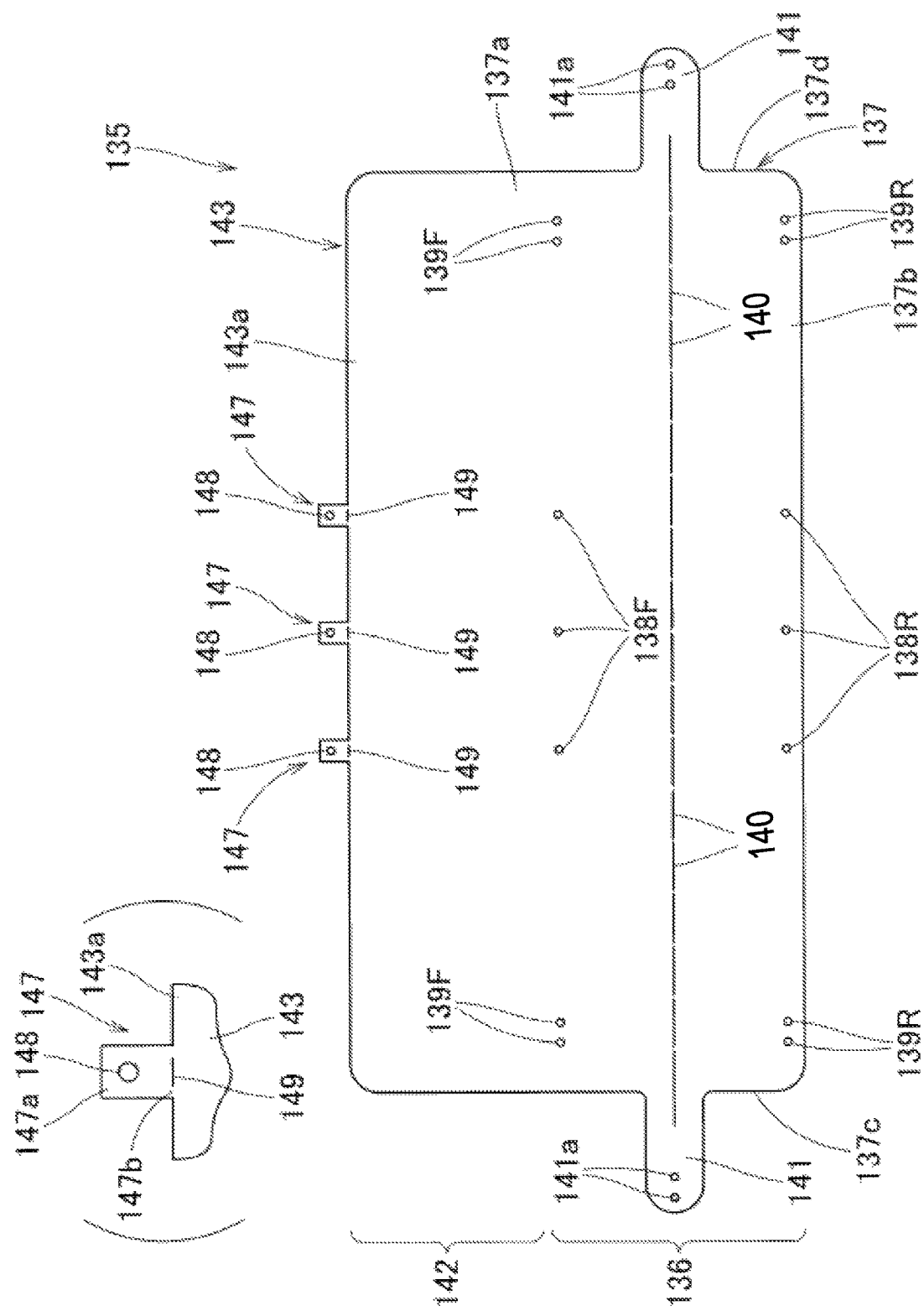
FIG. 18 is a plan view depicting a flatly-deployed state of the wrapping material that is used for the airbag device for pedestrian of FIG. 17.

Also, as the wrapping material 97 wrapped around the folding completion body 130, a wrapping material 135 having a configuration shown in FIGS. 17 and 18 may also be used. Like the wrapping material 97, the wrapping material 135 has a substantially rectangular outer shape in a flatly-deployed state and has a width dimension in the longitudinal direction, which substantially the same as the length dimension of the folding completion body 130, and a double structure of an inner part 136 to be arranged at an inner side and an outer part 142 configured to cover an outer side of the inner part 136 in a state where the wrapping material is wrapped around the folding completion body 130. The outer part 142 and the inner part 136 have the same width dimension in the longitudinal direction (the width dimension of the folding completion body 130 in the axial direction) and are configured to continue in the width direction.

The inner part 136 has a main body part 137 configured to cover the outer periphery-side of the folding completion body 130 over the entire circumference, and attachment piece parts 141 protruding from edge portions (a the left edge 137c and a right edge 137d) of the main body part 137 in the longitudinal direction. Each attachment piece part 141 is formed at a substantial central position of the main body part 137 in the width direction (the front and rear direction in the flatly-deployed state), and two insertion holes 145a for inserting therein the attachment bolts 122 are arranged at a tip end thereof. Both ends (a front end 137a and a rear end 137b in the flatly-deployed state) of the main body part 137 in the width direction are formed with insertion holes 138F, 138R, 139F, 139R for inserting therein the respective attachment bolts 44, 122. The insertion holes 138F, 138R are respectively formed in a central region of the inner part 136 in the right and left direction three by three, in correspondence to the attachment bolts 44, and the insertion holes 139F, 139R are respectively formed at both left and right ends of the inner part 136 two by two, in correspondence to the attachment bolts 122.

Slits 140 are intermittently formed at a substantial central position of the inner part 136 in the width direction, substantially along the longitudinal direction (the axial direction of the folding completion body 130). Like the slits 107 of the wrapping material 97, the slits 140 are formed to have intervals (coupling portions) therebetween by intermittently making linear cut lines at the inner part 136, and are arranged at an upper position (the opening 20a for protrusion of the case 20) of the folding completion body 130 in the state where the inner part 136 is accommodated with being wrapped around the folding completion body 130 in the case 20 (refer to FIG. 17). The slits 140 are ruptured at peripheral edge portions (the portions between the slits 140; the coupling portions) upon the inflation of the airbag 50. Like the slits 107 of the wrapping material 97, the slits 140 are configured so that end portions are located in the regions of the attachment piece parts 141 beyond the main body part 137.

The outer part 142 is arranged to extend forward continuously from the front end 136a of the inner part 136 in the flatly-deployed state of the wrapping material 135. In the illustrative embodiment, the outer part 142 has a main body part 143 formed continuously from the inner part 136 and temporary joining piece portions 147 protruding from a terminal 143a (a front edge in the flatly-deployed state) in the width direction, which is distant from the inner part 136 of the main body part 143. The main body part 143 is configured to cover the upper of the slits 140 at the outer periphery-side of the inner part 136 and to wrap a region beyond the slits 140 in the state where the wrapping material 135 is wrapped around the folding completion body 130. Specifically, as shown in FIG. 17, the main body part 143 is configured to cover a region from the front side to the rear side of the folding completion body 130 via the upper side at the outer periphery-side of the inner part 136 and is configured so that the terminal 112a (a front edge in the flatly-deployed state), which is an edge side distant from the region configuring the inner part 136, is located at a rear lower position of the folding completion body 130 when mounted to the vehicle.

In the illustrative embodiment, the temporary joining piece portions 147 have a band shape protruding from the terminal 143a of the main body part 143 and extending in the front and rear direction in the flatly-deployed state of the wrapping material 135, respectively, and the three temporary joining piece portions are formed in correspondence to the attachment bolts 44 of the inflator 35. Each temporary joining piece portion 147 is formed at a tip end 147a with an insertion hole 148 for inserting the attachment bolt 44. Also, a base part 147b of each temporary joining piece portion 147 is provided with a slit 149, which is formed by making a linear cut line. The slit 149 is configured to separate the main body part 143 and the temporary joining piece portion 147 by rupturing the peripheral edge upon the deployment and inflation of the airbag 50. That is, the temporary joining piece portion 147 is configured to temporarily join the terminal 143a of the main body part 143 of the outer part 142, which is an edge side distant from the region configuring the inner part 136, to the side of the folding completion body 130 by inserting the attachment bolt 44 into the insertion hole 148, and the slit 149 formed at the base part 147b-side is ruptured upon the deployment and inflation of the airbag 50, such that the joined state to the folding completion body 130 is released.

Although not shown in detail, a process of wrapping the wrapping material 135 around the folding completion body 130 is described. First, in the flatly-deployed state of the wrapping material 135, the folding completion body 130 is put at the rear end 137b-side of the main body part 137 of the inner part 136, the attachment bolts 44 of the inflator 35 are arranged to protrude from the insertion holes 138R and the attachment bolts 122 of the attachment bracket 120 are arranged to protrude from the insertion holes 139R. Then, the main body part 137 of the inner part 136 is wrapped around the folding completion body 130, the attachment bolts 44 are arranged to protrude from the insertion holes 138F, and the attachment bolts 122 are arranged to protrude from the insertion holes 139F. Thereafter, the attachment piece parts 141 are arranged to cover both the left and right ends of the folding completion body 130 with the attachment bolts 122 protruding from the insertion holes 141a. Then, the main body part 143 of the outer part 142 is wrapped around the folding completion body 130 so as to cover the outer periphery-side of the inner part 136, and the respective temporary joining piece portions 147 are temporarily joined to the terminal 143a of the main body part 143 by inserting the attachment bolts 44 into the insertion holes 148 formed at the tip end 147a, so that the operation of wrapping the wrapping material 135 around the folding completion body 130 is completed.

Also in the airbag device in which the wrapping material 135 configured as described above is used, the slits 140 formed in the region covering the upper of the folding completion body 130 are formed at the inner part 136, and the outer periphery-side of the inner part 136 is wrapped up to the region beyond the slits 140 by the outer part 142, so that it is possible to securely prevent the rainwater from being introduced to the folding completion body 130 through the slits 140.

Therefore, also in the airbag device in which the wrapping material 135 configured as described above is used, it is possible to rapidly deploy the airbag 50 and to correctly suppress the rainwater from being introduced into the folding completion body 130.

Also, according to the wrapping material 135 configured as described above, the outer part 142 (the main body part 143) has the configuration where the terminal 143a of the edge side distant from the region configuring the inner part 136 of the wrapping material 135 is temporarily joined to the side of the folding completion body 130 such that the joined state to the folding completion body 130 can be released upon the rupture of the slit 140. For this reason, it is possible to securely wrap the outer periphery-side of the inner part 136 having the slits 140 by the outer part 142. Also, even in the configuration where the outer periphery-side of the inner part 136 is wrapped by the outer part 142, since the joined state of the terminal 143a to the side of the folding completion body 130 is also released upon the rupture of the slits 140 at the early stage of the inflation of the airbag 50, it is possible to rapidly deploy the airbag 50 upon the deployment and inflation of the airbag 50, without interference with the rapid deployment and inflation of the airbag 50. On the other hand, when the above points are not considered, the outer part may be simply arranged to wrap the outer periphery-side of the inner part up to the region beyond the slits, without temporarily joining the terminal of the outer part to the side of the folding completion body.

In the illustrative embodiment, as the means for temporarily joining the terminal 143a of the main body part 143 of the outer part 142 to the side of the folding completion body 130, the temporary joining piece portion 147 configured integrally with the main body part 143 and having the rupturable slit 149 arranged at the base part 147b-side, which is the main body part 143-side, is used. However, the temporary joining means is not limited thereto. For example, a configuration where a terminal is bonded to an inner member-side by using a separate tape material capable of rupturing or releasing a bonded state to release a joined state upon the deployment and inflation of the airbag is also possible.

Also, in the illustrative embodiment, the main body part 143 of the outer part 142 is configured so that the terminal 143a is arranged in the region of the rear lower end-side of the folding completion body 130 upon the mounting to the vehicle. However, the main body part may have the smaller width dimension in the width direction inasmuch as it can wrap even the region beyond the slit.

In the illustrative embodiment, as the airbag device that is to be arranged at the outer side of the vehicle interior, the airbag device M for pedestrian that is mounted in the vicinity of the rear end 15c of the hood panel 15 has been exemplified. However, the airbag device to which the present invention can be applied is not limited to the illustrative embodiment. For example, the present invention can be applied to an airbag device that is to be accommodated in a front grill at the front of the hood panel or left and right side fender parts of the hood panel, too.

According to an aspect of the invention, there is provided an airbag device comprising: an airbag accommodated with being folded in an accommodation part to be arranged at an outer side of a vehicle interior and configured to protrude toward an outside of a vehicle upon inflation, the airbag accommodated in the accommodation part in a state where a wrapping material formed of a flexible sheet body is wrapped around a folding completion body formed by folding the air bag, wherein the accommodation part has an opening for protrusion at an upper side so as to enable the airbag to protrude therefrom, wherein the wrapping material is wrapped over an entire circumference around the folding completion body and a region thereof configured to cover an upper of the folding completion body has a double structure of an outer part and an inner part, wherein the outer part has slits that are intermittently formed substantially along an axial direction of the folding completion body so that peripheral edges thereof can be ruptured upon deployment and inflation of the airbag, and wherein the inner part is configured to cover a lower of the slits and is configured so that a terminal, which is an edge side distant from a region configuring the outer part of the wrapping material, is located below a central line extending substantially in a horizontal direction from a sectional center of the folding completion body.

In the airbag device of the present invention, the wrapping material wrapped around the folding completion body has the configuration where the slits for rupturing the peripheral edges thereof upon the deployment and inflation of the airbag are arranged in the region covering the upper of the folding completion body. However, since the wrapping material has the inner part so as to cover the lower of the slits, even when the rainwater and the like are introduced into the wrapping material from the slits, the rainwater is suppressed from being further introduced into the folding completion body by the inner part and flows along the inner part. Since the inner part is configured so that the terminal, which is the edge side distant from the region configuring the outer part of the wrapping material, is located below the central line extending substantially along the horizontal plane from the sectional center of the folding completion body, it is possible to correctly drop the rainwater flowing along the inner part from the terminal so that the rainwater is to drop from the folding completion body without being directed toward the folding completion body, thereby causing the rainwater to be collected at a part, which covers the lower surface-side of the folding completion body, of the wrapping material or to flow along the part, which covers the lower surface-side of the folding completion body, and to be discharged to an outside. For this reason, in the airbag device of the present invention, even when the rainwater and the like are introduced via the slits, it is possible to correctly prevent the rainwater from flowing toward the folding completion body. Also, upon the deployment and inflation of the airbag, the peripheral edge portions of the slits are ruptured, so that it is possible to rapidly deploy the airbag.

Therefore, according to the airbag device of the present invention, it is possible to rapidly deploy the airbag and to correctly suppress the rainwater from being introduced into the folding completion body.

Also, in the airbag device of the present invention, a region, which extends from the outer part so as to cover a lower side of the folding completion body, is preferably formed with an opening for exposing an outer peripheral surface of the folding completion body because it is possible to securely discharge the rainwater dropped from the terminal of the inner part from the opening to the outside.

Also, in an airbag device, the wrapping material may be wrapped over an entire circumference around the folding completion body and a region thereof configured to cover the upper of the folding completion body may have a double structure of an outer part and an inner part, slits that are intermittently formed substantially along an axial direction of the folding completion body so that peripheral edges thereof can be ruptured upon deployment and inflation of the airbag may be arranged in a region, which covers the upper of the folding completion body, of the inner part, and the outer part may be arranged to cover even a region beyond the slits.

In the airbag device configured as described above, the slits formed in the region covering the upper of the folding completion body are formed at the inner part, and the outer periphery-side of the inner part is wrapped up to the region beyond the slits by the outer part, so that it is possible to securely prevent the rainwater from being introduced to the folding completion body via the slits.

Therefore, also in the airbag device configured as described above, it is possible to rapidly deploy the airbag and to correctly suppress the rainwater from being introduced to the folding completion body.

Also, in the airbag device configured as described above, the outer part is preferably configured so that a terminal, which is an edge side distant from a region configuring the inner part of the wrapping material, is temporarily joined to a side of the folding completion body such that a joined state to the folding completion body can be released upon rupture of the slits. That is, thereby, it is possible to securely wrap the outer periphery-side of the inner part having the slits by the outer part. Also, even in the configuration where the outer periphery-side of the inner part is wrapped by the outer part, since the joined state of the terminal to the side of the folding completion body is also released upon the rupture of the slits at the early stage of the inflation of the airbag, it is possible to rapidly deploy the airbag upon the deployment and inflation of the airbag, without interference with the rapid deployment and inflation of the airbag.

What is claimed is:

1. An airbag device comprising:
    an airbag accommodated with being folded in an accommodation part to be arranged at an outer side of a vehicle interior and configured to protrude toward an outside of a vehicle upon inflation, the airbag accommodated in the accommodation part in a state where a wrapping material formed of a flexible sheet body is wrapped around a folding completion body formed by folding the air bag,
    wherein the accommodation part has an opening for protrusion at an upper side so as to enable the airbag to protrude therefrom,
    wherein the wrapping material is wrapped over an entire circumference around the folding completion body and a region thereof configured to cover an upper of the folding completion body has a double structure of an outer part and an inner part,
    wherein the outer part has slits that are intermittently formed substantially along an axial direction of the folding completion body so that peripheral edges thereof can be ruptured upon deployment and inflation of the airbag,
    wherein the inner part is configured to cover a lower of the slits and is configured so that a terminal, which is an edge side distant from a region configuring the outer part of the wrapping material, is located below a central line extending substantially in a horizontal direction from a sectional center of the folding completion body, and
    wherein a region, which extends from the outer part so as to cover a lower side of the folding completion body, of the wrapping material is formed with an opening for exposing an outer peripheral surface of the folding completion body.

2. An airbag device comprising:
    an airbag accommodated with being folded in an accommodation part to be arranged at an outer side of a vehicle interior and configured to protrude toward an outside of a vehicle upon inflation, the airbag accommodated in the accommodation part in a state where a wrapping material formed of a flexible sheet body is wrapped around a folding completion body formed by folding the air bag,
    wherein the accommodation part has an opening for protrusion at an upper side so as to enable the airbag to protrude therefrom,
    wherein the wrapping material is wrapped over an entire circumference around the folding completion body and a region thereof configured to cover an upper of the folding completion body has a double structure of an outer part and an inner part,
    wherein the inner part has slits that are intermittently formed substantially along an axial direction of the folding completion body so that peripheral edges thereof can be ruptured upon deployment and inflation of the airbag, in a region covering the upper of the folding completion body,
    wherein the outer part is arranged to cover even a region beyond the slits, and
    wherein the slits are configured so that end portions thereof are located in regions of attachment piece parts beyond a main body part of the wrapping material.

3. The airbag device according to claim 2, wherein the outer part is configured so that a terminal, which is an edge side distant from a region configuring the inner part of the wrapping material, is temporarily joined to a side of the folding completion body such that a joined state of the inner part to the folding completion body can be released upon rupture of the slits.

4. An airbag device comprising:
    a case which is to be provided at an outer side of a vehicle interior, which has an opening at an upper side;
    an airbag which is accommodated in the case with being folded, and which is configured to protrude toward an outside of a vehicle from the opening upon inflation; and
    a wrapping member which is wrapped around the airbag, and which has an inner part that covers an upper side of the airbag and an outer part that covers upper side of the inner part, one of the inner part and the outer part formed with a slit,
    wherein the outer part is formed with the slit,
a position of a terminal end of the inner part is lower than a position of a center of the airbag,
the wrapping member is formed with an opening, and
a position of the opening of the wrapping member is lower than a position of the airbag.

* * * * *